United States Patent
Holmström et al.

(10) Patent No.: US 11,516,706 B2
(45) Date of Patent: Nov. 29, 2022

(54) USAGE OF PRE-AUTHORIZED QOS

(71) Applicant: Telefonaktiebolaget LM Ericsson (publ), Stockholm (SE)

(72) Inventors: Jarl Tomas Holmström, Dalby (SE); Peter Hedman, Helsingborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 132 days.

(21) Appl. No.: 17/052,326

(22) PCT Filed: May 3, 2019

(86) PCT No.: PCT/EP2019/061397
§ 371 (c)(1),
(2) Date: Nov. 2, 2020

(87) PCT Pub. No.: WO2019/211445
PCT Pub. Date: Nov. 7, 2019

(65) Prior Publication Data
US 2021/0058827 A1    Feb. 25, 2021

Related U.S. Application Data

(60) Provisional application No. 62/667,083, filed on May 4, 2018.

(51) Int. Cl.
*H04W 28/24* (2009.01)
*H04L 47/80* (2022.01)
(Continued)

(52) U.S. Cl.
CPC ........... *H04W 28/24* (2013.01); *H04L 47/805* (2013.01); *H04L 67/61* (2022.05); *H04W 4/24* (2013.01);
(Continued)

(58) Field of Classification Search
CPC ... H04W 28/24; H04W 4/24; H04W 28/0263; H04W 28/0268; H04W 72/02; H04L 47/805; H04L 67/61
See application file for complete search history.

(56) References Cited

U.S. PATENT DOCUMENTS

2006/0256719 A1* 11/2006 Hsu ................ H04L 47/2491
                                                    370/397
2008/0019275 A1*  1/2008 Mudireddy ........... H04W 8/04
                                                    370/235
(Continued)

FOREIGN PATENT DOCUMENTS

EP             3300303 A1     3/2018

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.3.0, Mar. 2017, 1-386.
(Continued)

*Primary Examiner* — Afshawn M Towfighi
(74) *Attorney, Agent, or Firm* — Murphy, Bilak & Homiller, PLLC

(57) ABSTRACT

In one aspect, a device, operating in an access network that can provide a plurality of QoS levels for user data flowing to and from the device, establishes a packet data session via the access network and receives, from the access network, cost information associated with each of one or more QoS levels. The device selects, for user data for at least a first application or service, a QoS level from among the plurality of QoS levels based on the cost information. The device transmits packets carrying user data for the first application or service to the access network. The transmission includes
(Continued)

applying a QoS treatment to the user data according to the selected QoS level.

16 Claims, 16 Drawing Sheets

(51) Int. Cl.
  *H04W 4/24* (2018.01)
  *H04W 28/02* (2009.01)
  *H04L 67/61* (2022.01)
(52) U.S. Cl.
  CPC ... *H04W 28/0263* (2013.01); *H04W 28/0268* (2013.01)

(56) References Cited

U.S. PATENT DOCUMENTS

| | | | | |
|---|---|---|---|---|
| 2009/0097421 | A1* | 4/2009 | Zhu | H04L 12/1818 370/352 |
| 2011/0276442 | A1* | 11/2011 | Momtahan | H04M 15/88 455/406 |
| 2012/0196566 | A1 | 8/2012 | Lee et al. | |
| 2016/0105821 | A1* | 4/2016 | Senarath | H04W 72/087 370/329 |
| 2019/0075107 | A1* | 3/2019 | Chiaverini | H04W 88/16 |
| 2020/0314730 | A1* | 10/2020 | Kollar | H04W 24/10 |

OTHER PUBLICATIONS

3GPP, "3rd Generation Partnership Project; Technical Specification Group Services and System Aspects; General Packet Radio Service (GPRS); Service description; Stage 2 (Release 14)", 3GPP TS 23.060 V14.3.0, Mar. 2017, 1-367.

3GPP, "3rd Generation Partnership Project; Technical Specification Group Services and System Aspects; Procedures for the 5G System; Stage 2 (Release 15)", 3GPP TS 23.502 V0.2.0, Feb. 2017, 1-71.

3GPP, "3rd Generation Partnership Project; Technical Specification Group Services and System Aspects; Study on Architecture for Next Generation System (Release 14)", 3GPP TR 23.799 V14.0.0, Dec. 2016, 1-522.

3GPP, "3rd Generation Partnership Project; Technical Specification Group Services and System Aspects; System Architecture for the 5G System; Stage 2 (Release 15)", 3GPP TS 23.501 V0.3.0, Feb. 2017, 1-97.

3GPP, "3rd Generation Partnership Project; Technical Specification Group Services and System Aspects; System Architecture for the 5G System; Stage 2 (Release 15)", 3GPP TS 23.501 V0.3.1, Mar. 2017, 1-97.

3GPP, "3rd Generation Partnership Project; Technical Specification Group Services and System Aspects; System Architecture for the 5G System; Stage 2 (Release 15)", TS 23.501 V15.2.0, Jun. 2018, 1-217.

* cited by examiner

USAGE OF PRE-AUTHORIZED QOS

TECHNICAL FIELD

The present invention generally relates to communication networks, and particularly relates to a device and a network node operating in a network that can provide a plurality of quality-of-service (QoS) levels for user data flowing to and from the wireless device. Typically, the invention refers to wireless communication but the 5G architecture is a converged network also possible to be used by e.g. fixed access. References and descriptions of wireless devices and radio access network should be seen as typical examples of communication devices and access networks.

BACKGROUND

The fifth-generation (5G) system currently under development by members of the 3$^{rd}$-Generation Partnership Project (3GPP) is expected to support a QoS flow-based framework. As described in 3GPP TS 23.501, version 0.3.1, section 5.7:

The network provides QoS rules to the UE for the classification and marking of UL traffic, i.e. the association of uplink traffic to QoS flows. These rules can be explicitly signaled over N1, pre-configured in the UE or implicitly derived by UE from reflective QoS. A QoS rule contains the QFI of the QoS flow, packet filters and corresponding precedence values. A default QoS rule is provided to the UE at PDU Session establishment, i.e. the default QoS rule shall include a packet filter which may be a match-all packet filter and an evaluation precedence value with highest possible value. In addition, pre-authorized QoS rules may be provided to the UE. QoS rules can be also provided at QoS flow establishment.

Here, PDU stands for packet data unit, and the term "PDU Session" is similar to what has previously been referred to as a Packet Data Network (PDN) connection. N1 refers to a reference point between the user equipment (UE) and an Access and Mobility Management Function (AMF). The "pre-authorized QoS rules" referred to here are new, compared to the standards for LTE and earlier wireless communications systems developed by 3GPP.

FIG. 1 shows general principles of classification and User Plane marking for quality-of-service (QoS) Flows and mapping to Access Network (AN) Resources. The mapping of application data packets to QoS flows is realized through packet filters as illustrated by the "NAS" filters 110 in FIG. 1. The AN 120 establishes the necessary AN resources and maps the QoS flows to data radio bearers (DRBs), ensuring that the UE 130 receives the QoS treatment indicated by the QoS Flow ID's (QFI) respective QoS profile.

A few additional details regarding pre-authorized QoS can be found in the study document 3GPP TR 23.799 section 6.2.4.2.1, which states: "In certain scenarios, when the UE establishes a PDU session towards a Data Network, the network may have policies associated to the UE subscription profile that indicate that certain data flows are pre-authorized to obtain a specific level of QoS. This may be based e.g. on specific applications in the UE." Note that in current available systems Evolved Packet Systems (EPS) (e.g., see 3GPP TS 23.401, v. 14.3.0) and General Packet Radio Service (GPRS) (e.g., see 3GPP TS 23.060, v. 14.3.0), the specifications allow both network initiated and UE initiated QoS. According to 3GPP TS 23.501, v. 15.2.0, section 5.7.3.2, "GBR QoS Flows are therefore typically authorized "on demand" which requires dynamic policy and charging control. [ . . . ] A Non-GBR QoS Flow may be pre-authorized through static policy and charging control." This means that the network may pre-authorize the UE, during PDU session establishment or later through PDU session modification, to use one or more specific levels of QoS for one or more packet flows, without any preceding UE request to set up a bearer service (or other type of request for resources) for such QoS levels, to, for example, an Application Function (AF). These pre-authorized levels of QoS could be intended to be better than the QoS level provided by the default QoS flow.

There is, however, no mention in the currently available standardization documents regarding how this is intended to be used, or the implications for the end-user if it is used. It could be assumed that service providers, typically public land mobile network (PLMN) operators, would like to use pre-authorized QoS as an add-on service offered to the end-user as a means for the end-user to obtain a "better" QoS (e.g., higher bit rate or lower latency), such as for applications that would require or at least benefit from the better QoS. Furthermore, it is not unreasonable to assume that there would be increased cost levels and/or time-based limits associated with the end-user's usage of better QoS through the pre-authorized QoS levels.

In current systems EPS and GPRS, QoS usage is often limited to network-initiated QoS for certain specific services (e.g., IP multimedia subsystem, or IMS) having known characteristics and under operator control. UE-initiated QoS has been specified, but is often not implemented or used. One reason is that there is no clear way to limit the usage of QoS in an understandable way for the user. That is, there is no incentive under current standards for the user terminal to refrain from always requesting the best possible QoS that is available. Accordingly, UE-initiated QoS has not been made available.

It is recognized that there is a need to specify mechanisms to enable the "user" (UE end-user and/or UE application) to monitor and control the usage of pre-authorized QoS levels.

SUMMARY

Embodiments of the present invention address the issues described above and enable the network operator to have different price plans for usage of default QoS and various pre-authorized QoS flows. The mechanisms described in the 3GPP 5GS standard can be enhanced such that each QoS flow provided to the UE can be associated with Charging Information (CI) in addition to the QoS information.

The UE can then use the CI, for example, as follows. First, using a man-machine interface (MMI), a user may select a profile/level, such as cheapest/normal/cost no issue or "Gold"/"Silver"/"Bronze", or acceptable quality/higher/best quality, or default/enhanced performance. The entity in the UE then maps the MMI input (which may be set for the UE in total or per application, flow, etc.) to the usage of the QoS Flow IDs (QFIs), by, for example, routing Service Data Flows (SDFs) such that packets of a specific application get a certain pre-authorized QoS. The UE logic ensures that only authorized applications are able to use the pre-authorized QoS for the set preconditions. The set preconditions may include, for example, the time of day, always, or whenever the user/MMI enables the usage. The network may then monitor the usage and apply differentiated charging and/or time constraints for the usage of the QFIs.

This solution can also be used for current EPS and GPRS systems by extending the existing signaling such that CI gets associated to either an EPS bearer or a packet data protocol (PDP) context. When the EPS bearer or PDP context has been established and the UE receives the associated CI, the user or UE will know the cost of using the established EPS bearer or PDP context for user data. To give a UE flexibility for using such EPS bearer and PDP context, the TFT (Traffic Flow Template including packet filters and precedence values) could be excluded or include wide packet filters allowing much or all of the UE user data (i.e., the UE will decide which user data will be sent using the EPS bearer/PDP context with enhanced QoS).

In addition, some management procedures can be added allowing the user or UE to request information about the current 5G QoS Indicator (5QI)/QFI, EPS bearer or PDP context. For example, the UE can send a request for CI to the network, for example, using a protocol configuration options information element (PCO IE), or via application layer signaling to a portal or AF, for a PDU session, packet data network (PDN) connection or PDP context, a service, or an application. The network, in this example, then replies with the current CI to the UE, via the AF in case of application layer signaling been used. Also, the UE can be allowed to request resources that are not tied to a specific traffic flow template (TFT)/traffic aggregate description (TAD).

According to some embodiments, a method, in a device operating in an access network that can provide a plurality of QoS levels for user data flowing to and from the device, includes establishing a packet data session via the access network and receiving, from the network, cost information, associated with each of one or more QoS levels. The method also includes selecting, for user data for at least a first application or service, a QoS level from among the plurality of QoS levels, wherein said selecting is based on the cost information. The method further includes transmitting packets carrying user data for the first application or service to the access network. The transmitting includes applying a QoS treatment to the user data according to the selected QoS level. This applying the QoS treatment may comprise, in some embodiments, negotiations, or requests, with the network to change packet filter precedence values, or to request a certain application, identified by an application identifier, to get a certain QoS treatment, causing packets carrying user data for the first application or service to be marked with a first quality flow indicator (QFI) corresponding to the selected QoS level, such that said transmitting the packets carrying user data for the first application or service comprises transmitting the packets to the access network. Further, applying the QoS treatment may comprise, in some embodiments, requests from the UE to, due to CI, change the QoS level, or charging level, for an application, identified by an application identifier, to the network. The request may apply using NAS signaling, via the access network, towards the network, or using application layer signaling, towards an AF which request the change towards the network.

According to some embodiments, a method, in a device operating in an access network that can provide a plurality of QoS levels for user data flowing to and from the device, includes establishing a packet data session via the access network and receiving, from the network, packet filters including corresponding precedence values and cost information, associated with each of one or more QoS levels. The method also includes presenting to a user of the device, using a man-machine interface (MMI), two or more choices for service levels for at least a first application or service, the two or more selections corresponding to respective QoS levels having differing costs according to the cost information. The method then includes receiving, via the MMI, a user selection of one of the two or more choices for service levels and selecting, for user data for at least a first application or service, a QoS level from among the plurality of QoS levels based on the received user selection. The method further includes transmitting packets carrying user data for the first application or service to the access network, where the transmitting again includes applying a QoS treatment to the user data according to the selected QoS level. As in the previous example, applying the QoS treatment may comprise, in some embodiments, negotiations, or requests, with the network to change packet filter precedence values, or to request a certain application, identified by an application identifier, to get a certain QoS treatment, causing packets carrying user data for the first application or service to be marked with a first QFI corresponding to the selected QoS level, such that said transmitting the packets carrying user data for the first application or service comprises transmitting the packets to the access network. As in the previous example, applying the QoS treatment may comprise, in some embodiments, requests from the UE to, due to CI, change the QoS level, or charging level, for an application, identified by an application identifier, to the network. The request may apply using NAS signaling, via the access network, towards the network, or using application layer signaling, towards an AF which request the change towards the network.

According to some embodiments, a method, in a network node in an access network that can provide a plurality of QoS levels for user data flowing to and from a device, includes establishing, with the device, a packet data session. Establishing the packet data session includes providing, to the device, precedence values associated with each of a plurality of QoS levels, each of the plurality of QoS levels corresponding to a respective QFI. The establishing also includes providing, to the device, cost information associated with each of one or more of the QoS levels.

According to some embodiments, a device, configured to operate in an access network that can provide a plurality of QoS levels for user data flowing to and from the device, includes transceiver circuitry configured for communicating with the access network and processing circuitry operatively associated with the transceiver circuitry. The processing circuitry is configured to establish a packet data session via the access network and receive, from the access network via the transceiver circuitry, cost information associated with each of one or more QoS levels. The processing circuitry is also configured to select, for user data for at least a first application or service, a QoS level from among the plurality of QoS levels based on the cost information. The processing circuitry is configured to then transmit packets carrying user data for the first application or service to the access network via the transceiver circuitry, where the transmitting comprises applying a QoS treatment to the user data according to the selected QoS level.

According to some embodiments, a device, configured to operate in an access network that can provide a plurality of QoS levels for user data flowing to and from the device, includes transceiver circuitry configured for communicating with the access network and processing circuitry operatively associated with the transceiver circuitry. The processing circuitry is configured to establish, with the access network, a packet data session and receive, from the access network via the transceiver circuitry, cost information associated with each of one or more QoS levels. The processing circuitry is configured to present to a user of the device, using a MMI, two or more choices for service levels for at least a first application or service, the two or more selections corresponding to respective QoS levels having differing costs according to the cost information. The processing circuitry is also configured to receive, via the MMI, a user selection of one of the two or more choices for service levels and select, for user data for at least a first application or service, a QoS level from among the plurality of QoS levels based on the received user selection. The processing circuitry is configured to then transmit packets carrying user data for the first application or service to the access network via the transceiver circuitry, where the transmitting comprises applying a QoS treatment to the user data according to the selected QoS level.

According to some embodiments, a network node in an access network configured to provide a plurality of QoS levels for user data flowing to and from a device includes transceiver circuitry configured for communicating with the device and processing circuitry operatively associated with the transceiver circuitry. The processing circuitry is configured to establish, with the device, a packet data session by providing, to the device via the transceiver circuitry, precedence values associated with each of a plurality of QoS levels (each QoS level corresponding to a respective QFI) and cost information associated with each of one or more of the QoS levels.

The method may also be implemented by apparatus, devices, computer readable medium, computer program products and functional implementations.

Of course, the present invention is not limited to the above features and advantages. Those of ordinary skill in the art will recognize additional features and advantages upon reading the following detailed description, and upon viewing the accompanying drawings.

DETAILED DESCRIPTION

There may be three types of QoS levels available to the UE: 1) the default QoS level assigned to the initial "bearer" that is typically best effort; 2) a specific QoS level intended by the network to be used for a specific type of traffic (e.g., voice, video); and 3) a pre-authorized QoS level not earmarked for any special purpose by the network, but for possible use by the end-user/UE to get better-than-best effort QoS for some application(s). The solution involves the third type, or the pre-authorized QoS levels.

Various embodiments described herein involve a radio network that provides cost information, or Charging Information (CI), associated with each of multiple QoS levels to the user or UE. This enables the end-user or UE to know the implications of using a pre-authorized QoS level in 5G and to make an informed decision about when and for what to use pre-authorized QoS flows. Accordingly, the user or UE can then select a QoS level for user data of a service or application, based on the received cost information. The UE then applies a QoS treatment to the user data according to the selected QoS level.

This solution can reduce customer complaints caused by unexpected increased costs and/or worse-than-expected performance, due to the pre-authorized QoS levels. This also allows the operator/service provider to promote the pre-authorized QoS levels to the end user.

The solution is described in the context of the establishment of a packet data session. In LTE, the packet data session may be referred to as or include a "PDN connection," while in 5G or New Radio (NR), the packet data session may be referred to as or include a "PDU session." This could more be more broadly described as establishing, through the radio access network, a possibility to communicate between a UE and a packet data network with packet data.

Figure 1:
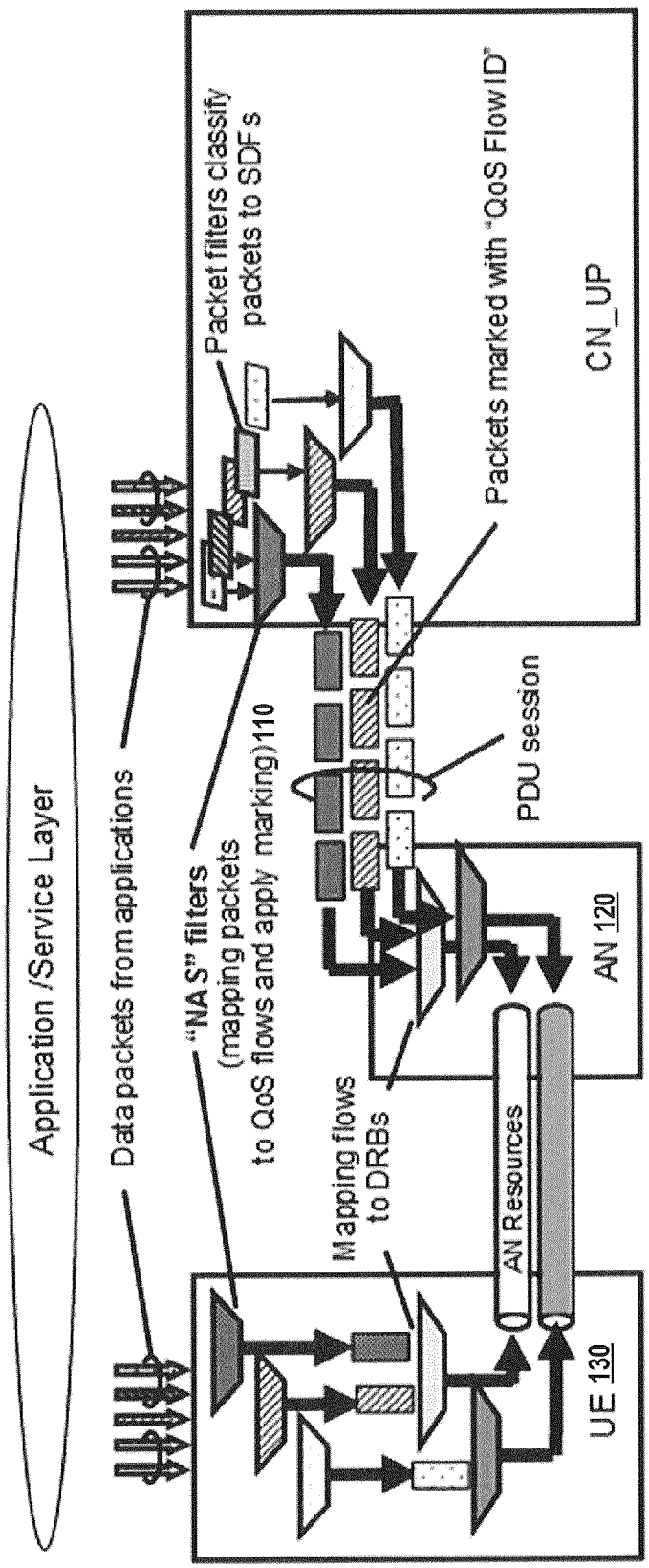
FIG. 1 is a diagram illustrating the principle of classification and User Plane marking for QoS Flows and mapping to AN Resources.
Figure 2A:
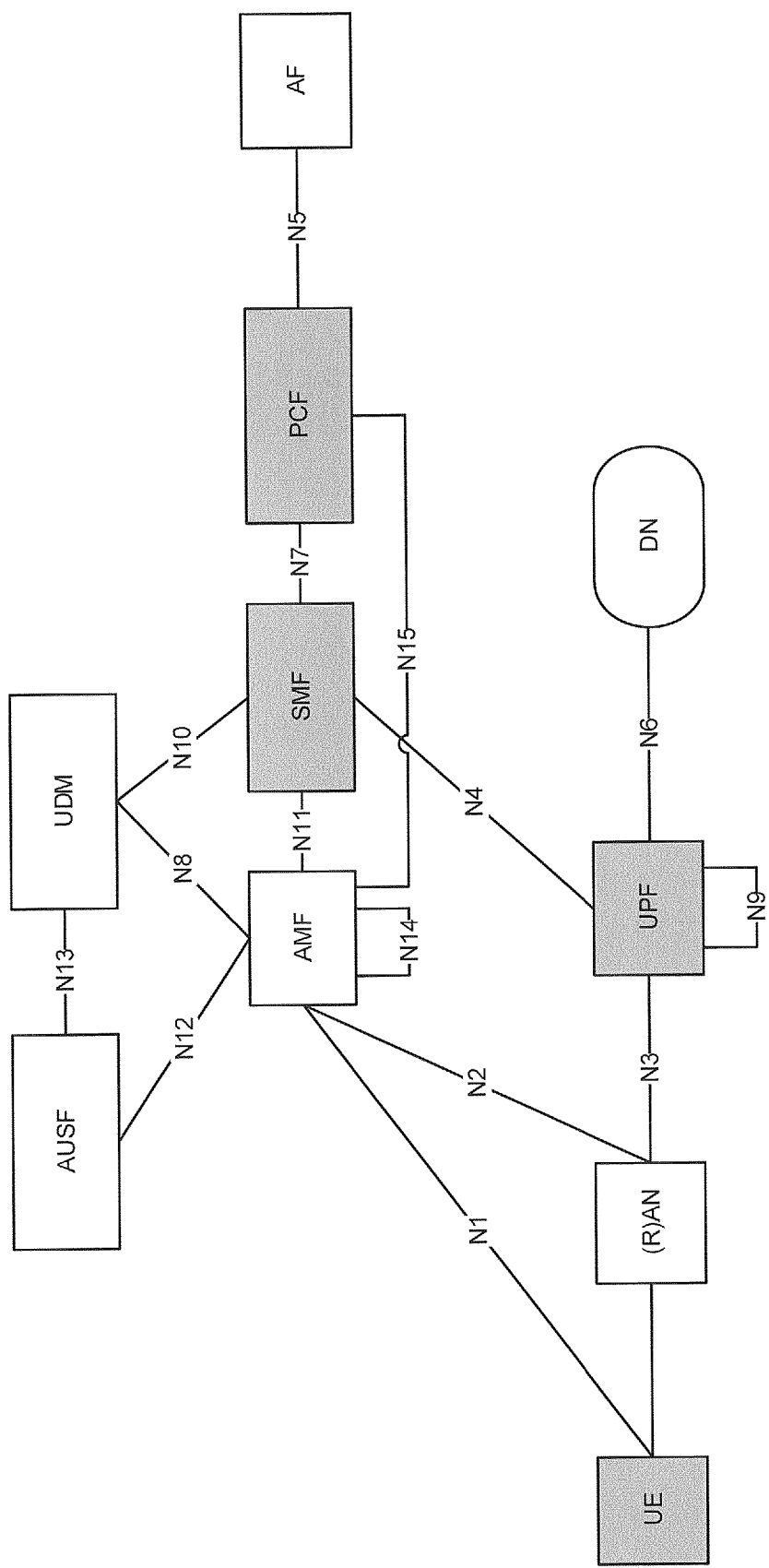
FIG. 2A is a diagram illustrating Non-Roaming 5G System Architecture with 3GPP Access in reference point representation.
Figure 2B:
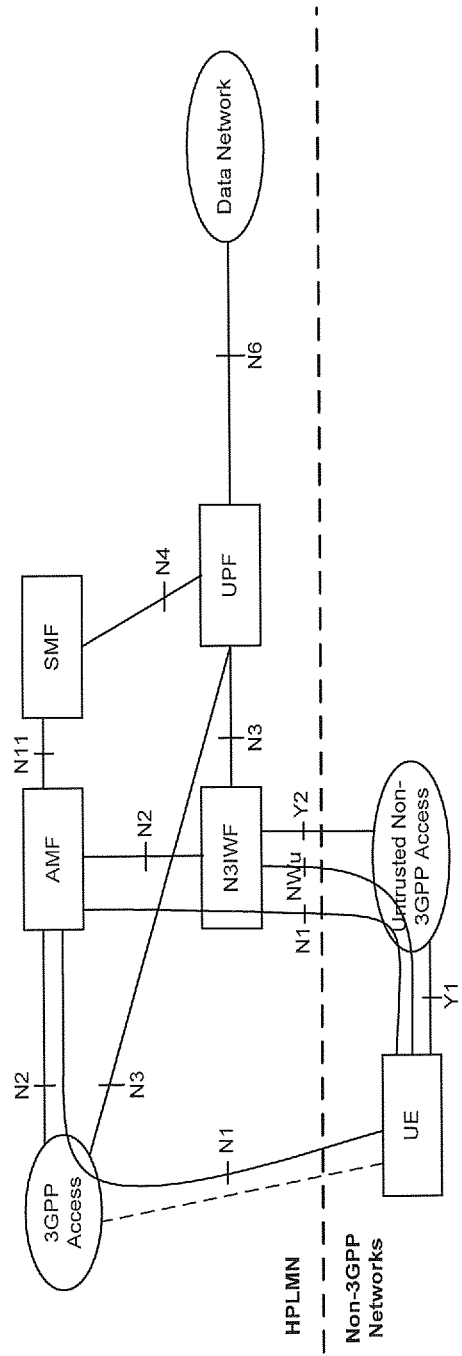
FIG. 2B is a diagram illustrating Non-Roaming 5G System Architecture with untrusted non-3GPP access network, e.g. Fixed access.
Figure 3:
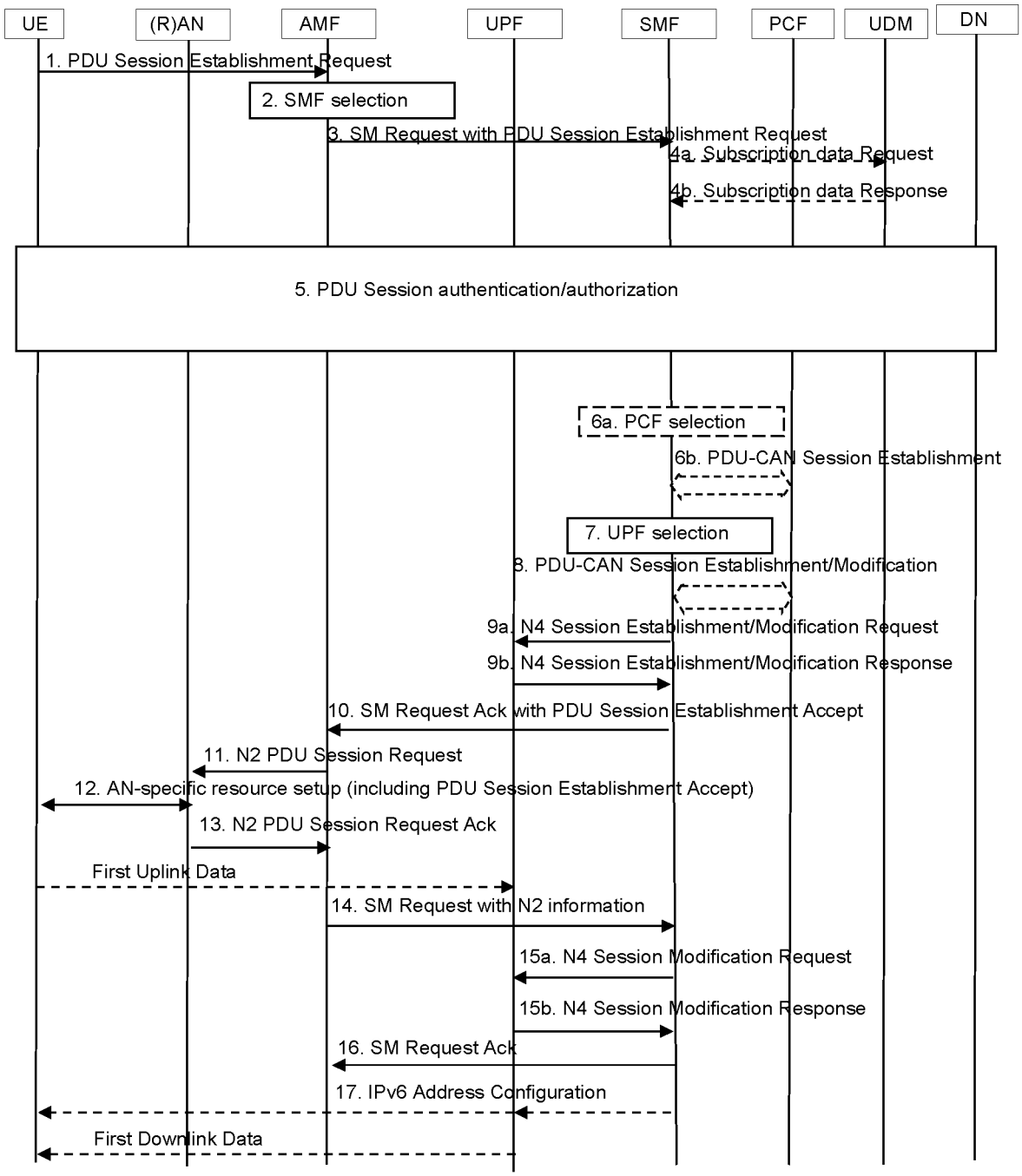
FIG. 3 is a diagram illustrating UE-requested PDU Session Establishment for non-roaming and roaming with local breakout.

FIG. 2A shows the Non-Roaming 5G System Architecture in reference point representation, FIG. 2B is a diagram illustrating Non-Roaming 5G System Architecture with untrusted non-3GPP access network, and FIG. 3 shows a PDU Session Establishment procedure. These figures will be used to describe the establishment of a PDU session in more detail. Note that authorized QoS Rules are provided to the UE in Steps 10-12 of the PDU Session Establishment procedure, which will now be described in more detail. It will be appreciated, however, that while the details provided here provide a specific context for applying the inventive techniques described herein, some of these details may vary when 5G is specified in further detail. Furthermore, the application of those inventive techniques is not limited to this specific context.

To aid the description, FIG. 2A's illustration of a Non-Roaming 5G System Architecture shows an Authentication Server Function (AUSF), Unified Data Management (UDM), Access and Mobility Management Function (AMF), Session Management Function (SMF), Policy Control Function (PCF), Application Function (AF), UE, Radio Access Network (RAN), User Place Function (UPF) and Data Network (DN). The numbered Ns are reference points between the elements. FIG. 2B's illustration of a Non-Roaming 5G System Architecture with untrusted non-3GPP access network, e.g. Fixed access, shows the possibility of also using a non-3GPP access network. e.g. via a Non-3GPP Interworking Function (N3IWF) interface (to 5G core network control-plane functions and user-plane functions via N2 interface and N3 interface, respectively. In other words, the described method applies to any type of access network. In the case where the UE is Roaming, the AMF determines if a PDU session is to be established in local breakout (LBO) or Home Routing. In the case of LBO, the procedure is as in the case of Non-Roaming but with the difference being that the SMF, UPF and PCF are located in the visited network.

The procedure shown in FIG. 3 is presented on the basis of an assumption that the UE has already registered on the AMF, which implies that the AMF has already retrieved the user subscription data from the UDM. In Step 1 (from UE to AMF: Non-Access Stratum (NAS) Message (S-NSSAI, DNN, PDU Session ID, N1 SM information)), in order to establish a new PDU session, the UE generates a new PDU Session ID. The UE initiates the UE Requested PDU Session establishment procedure by the transmission of a NAS message containing a PDU Session Establishment Request within the N1 SM information. The PDU Session Establishment Request may include a PDU Type, SSC mode, Protocol Configuration Options. The NAS message sent by the UE is encapsulated by the AN in an N2 message that should include User location information and Access Technology Type Information. The SM information may contain SM PDU DN Request Container containing information for the PDU session authorization by the external DN.

At Step 2, the AMF determines that the message corresponds to a request for a new PDU Session based on the PDU Session ID that is not used for any existing PDU Session(s) of the UE. The AMF selects an SMF as described in 3GPP TS 23.501, v. 0.3.1, clause 6.3.2.

At Step 3 (from AMF to SMF: SM Request (Subscriber Permanent ID, DNN, S-NSSAI, PDU Session ID, AMF ID, N1 SM information, User location information, Access Technology Type)), the AMF ID uniquely identifies the AMF serving the UE. The N1 SM information contains the PDU Session Establishment Request received from the UE.

At Step 4a (SMF to UDM: Subscription Data Request (Subscriber Permanent ID, DNN)), if the SMF has not yet retrieved the SM-related subscription data for the UE related with the DNN, the SMF requests this subscription data. At Step 4b (UDM to SMF: Subscription Data Response), subscription data includes the authorized PDU type(s), authorized SSC mode(s), Default QoS profile. It is noted that further detailing of SM-related subscription data is FFS. The SMF checks whether the UE request is compliant with the user subscription and with local policies. If that is not the case, the SMF rejects the UE request via NAS SM signaling (including a relevant SM rejection cause) relayed by the AMF, the SMF indicates to the AMF that the PDU session ID is to be considered as released and the rest of the procedure is skipped.

At Step 5 (SMF to DN via UPF), if the SMF needs to authorize/authenticate the establishment of the PDU session as described in clause 5.6.6 of 3GPP TS 23.501, v. 0.3.1, the SMF selects an UPF as described in clause 6.3.3 of this same document, and triggers the PDU session establishment authentication/authorization as described in section 4.3.2.X. If the PDU session establishment authentication/authorization fails, the SMF terminates the PDU session establishment procedure and indicates a rejection to the UE.

At Step 6a, if dynamic PCC is deployed, the SMF performs PCF selection. At Step 6b, the SMF may initiate PDU-CAN Session Establishment towards the PCF to get the default PCC Rules for the PDU Session. It is noted that the purpose of Step 5 is to receive PCC rules before selecting UPF. If PCC rules are not needed as input for UPF selection, Step 5 can be skipped.

At Step 7, the SMF selects an SSC mode for the PDU Session. If Step 5 is not performed, the SMF also selects an UPF as described in 3GPP TS 23.501, v. 0.3.1, clause 6.3.3. In case of PDU Type IPv4 or IPv6, the SMF allocates an IP address/prefix for the PDU Session as described in 3GPP TS 23.501, v. 0.3.1, clause 5.8.1.

At Step 8, if dynamic PCC is deployed and the PDU-CAN Session Establishment was not done in Step 5, the SMF initiate PDU-CAN Session Establishment towards the PCF to get the default PCC Rules for the PDU Session. Otherwise, if dynamic PCC is deployed and PDU Type is IPv4 or IPv6, SMF initiates PDU-CAN Session Modification and provides the allocated UE IP address/prefix to the PCF.

At Step 9, if step 5 was not performed, the SMF initiates an N4 Session Establishment procedure with the selected UPF, otherwise it initiates an N4 Session Modification procedure with the selected UPF. At Step 9a, the SMF sends an N4 Session Establishment/Modification Request to the UPF and provides Packet detection, enforcement and reporting rules to be installed on the UPF for this PDU Session. If CN Tunnel Info is allocated by the SMF, the CN Tunnel Info is provided to UPF in this step. At Step 9b, the UPF acknowledges by sending an N4 Session Establishment/Modification Response. If CN Tunnel Info is allocated by the UPF, the CN Tunnel Info is provided to SMF in this step.

At Step 10 (SMF to AMF: SM Request Ack (N2 SM information (PDU Session ID, QoS Profile, CN Tunnel Info), N1 SM information (PDU Session Establishment Accept (Authorized QoS Rule, SSC mode))) to the AMF), the N2 SM information carries information that the AMF shall provide to the (R)AN. The CN Tunnel Info corresponds to the Core Network (CN) address of the N3 tunnel corresponding to the PDU session. The QoS Profile provides the AN with the mapping between QoS parameters and QoS Flow Identifiers. This is further described in 3GPP TS 23.501, v. 0.3.1, clause 5.7. The PDU Session ID may be used by AN signaling with the UE to indicate to the UE the association between AN resources and a PDU session for the UE. The N1 SM information contains the PDU Session Establishment Accept that the AMF shall provide to the UE. Multiple Authorized QoS Rules may be included in the PDU Session Establishment Accept within the N1 SM information and in the N2 SM information. The SM Request Ack further contains information allowing the AMF to know which UE is the target of the SMF request as well to determine which access towards the UE to use. Note that the access information is to deal with the case where a UE is simultaneously connected over 3GPP and Non 3GPP access. It is also noted that further studies are needed to determine the nature of the information allowing the AMF to know which UE is the target of the SMF request as well as to determine which access towards the UE to use.

At Step 11 (AMF to (R)AN: N2 PDU Session Request (N2 SM information, PDU Session Establishment Accept)), the AMF sends the PDU Session Establishment Accept and the N2 SM information received from the SMF within the N2 PDU Session Request to the (R)AN.

At Step 12 ((R)AN to UE), the (R)AN may issue an AN-specific signaling exchange with the UE that is related with the information received from SMF. For example, in case of a 3GPP RAN, an RRC Connection Reconfiguration may take place with the UE establishing the necessary RAN resources related to the Authorized QoS Rules for the PDU Session request received in Step 10. (R)AN also allocates (R)AN tunnel information for the PDU Session. (R)AN forwards the NAS message (PDU Session Establishment Accept) provided in Step 10 to the UE. (R)AN shall only provide the NAS message to the UE if the necessary RAN resources are established and the allocation of (R)AN tunnel information are successful.

At Step 13 ((R)AN to AMF: N2 PDU Session Request Ack ((R)AN Tunnel Info)), the (R)AN Tunnel Info corresponds to the Access Network address of the N3 tunnel corresponding to the PDU session.

At Step 14 (AMF to SMF: SM Request (N2 SM information)), the AMF forwards the N2 SM information received from (R)AN to the SMF. It is noted that it is FFS if steps are needed to indicate from the UE to the core network that the UE has successfully established the PDU Session, or whether it is sufficient with a successful establishment in (R)AN indicated in Step 12. For example, it is FFS if the UE shall send a NAS PDU Session Establishment Complete message to indicate that the UE has successfully established the PDU Session.

At Step 15a, if the N4 session for this PDU Session was not established already, the SMF initiates an N4 Session Establishment procedure with the UPF. Otherwise, the SMF initiates an N4 Session Modification procedure with the UPF. The SMF provides AN Tunnel Info and CN Tunnel Info. The CN Tunnel Info only needs to be provided if the SMF selected CN Tunnel Info in Step 8. At Step 15b, the UPF provides a N4 Session Establishment/Modification Response to the SMF.

At Step 16, the AMF forwards relevant events to the SMF, for example, at handover where the (R)AN Tunnel Info changes or the AMF is relocated. It is noted that it is FFS if the SMF has to explicitly subscribe to these events or whether the subscription is implicit.

At Step 17 (SMF to UE, via UPF: In case of PDU Type IPv6, the SMF generates an IPv6 Router Advertisement and sends it to the UE via N4 and the UPF), during the lifetime of the PDU session, the AMF stores an association of the PDU session ID and the SMF ID. Now, having established the PDU Session Establishment procedure in 5G, as mentioned above, the solutions described below will involve further details for Steps 10-12 in sequence from 3GPP TS 23.502, v. 0.2.0, section 4.3.2.2.1 shown above. At Step 10, the SM Request Ack with PDU Session Establishment Accept is sent from SMF to AMF and may include multiple Authorized QoS Rules in the PDU Session Establishment Accept. At Step 11, the PDU Session Establishment Accept containing the Authorized QoS Rules are sent to the (R)AN.

At Step 12, (R)AN forwards the PDU Session Establishment Accept, containing the Authorized QoS Rules, provided in Step 10 to the UE.

In the current specification text (TS 23.501), the QoS Rules contents are specified to include: QFI of the QoS flow, packet filters, and corresponding precedence values. In some embodiments of the present invention, the QoS Rule contents are extended to include also Charging Information (CI), also referred to as cost information.

The added parameter CI may contain supplementary information related to, for example, cost levels and/or time based limits associated with the end-user's usage of a QoS flow associated with the QFI in the related QoS rule. In addition, information regarding which application or application type that is authorized to use a pre-authorized QoS flow may be included in the CI, in some embodiments.

Figure 4:
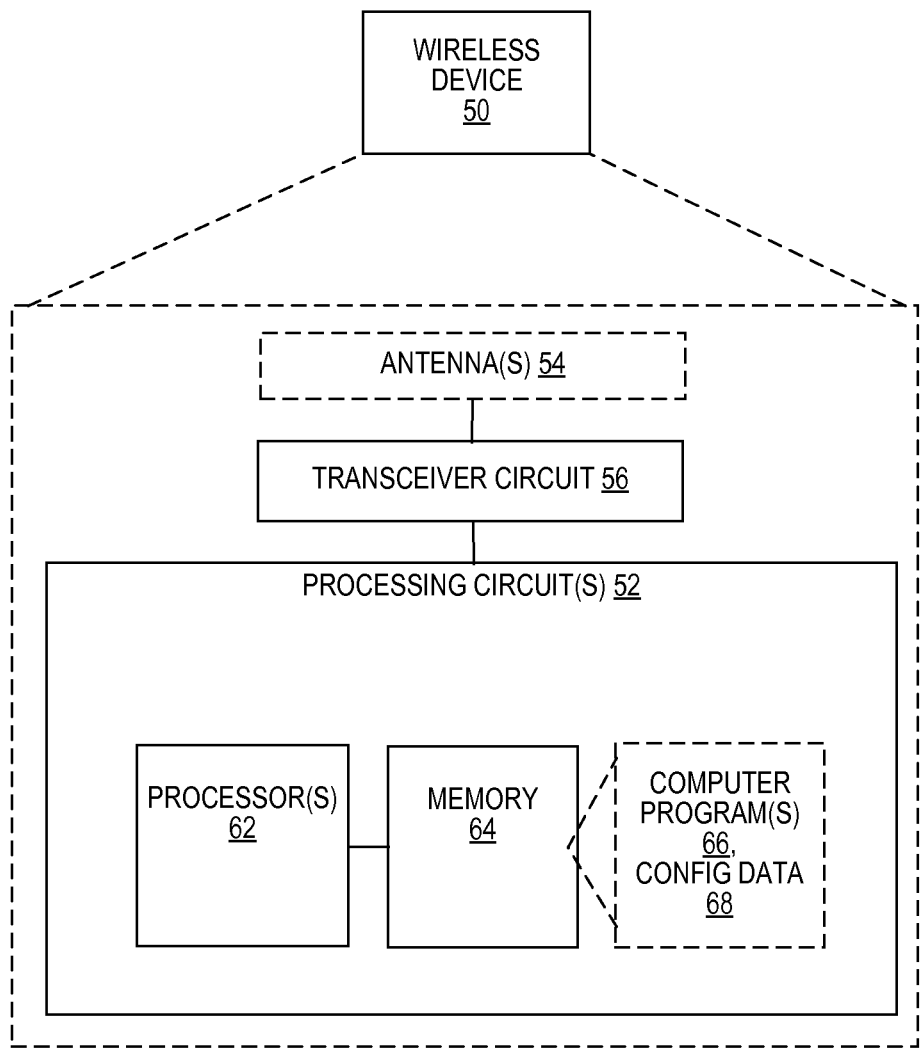
FIG. 4 is a block diagram of a wireless device configured to select and apply a QoS level for data of an application or service based on cost information associated with QoS levels, according to some embodiments. A device without an antenna is equally applicable.

FIG. 4 illustrates a diagram of a wireless device 50, such as a UE, that would receive and use the CI, according to some embodiments. The wireless device 50 may be a target device, a D2D UE, a machine type UE, or a UE capable of Machine-to-Machine (M2M) communication, a sensor equipped with a UE, an iPAD, a tablet, a mobile terminal, a smart phone, Laptop Embedded Equipped (LEE), Laptop Mounted Equipment (LME), Universal Serial Bus (USB) dongles, Customer Premises Equipment (CPE), an IoT (Internet of Things) capable device, or any other device capable of communicating with a fixed or wireless access 5G and/or NR network, etc. Thus, a device without an antenna is equally applicable.

The wireless device 50 communicates with a radio node or base station, such as a network node of the network via antennas 54 and a transceiver circuit 56. The transceiver circuit 56 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, GSM, GPRS, WCDMA, HSDPA, LTE, LTE-Advanced, 5G, NR, etc.

The wireless device 50 also includes one or more processing circuits 52 that are operatively associated with the radio transceiver circuit 56. The processing circuit 52 comprises one or more digital processing circuits, e.g., one or more processors 62 (e.g., Central Processing Units (CPUs), Application Specific Integrated Circuits (ASICs), Field Programmable Gate Arrays (FPGAs), and/or the like or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the wireless device 50.

In some embodiments, the processor 62 of the processing circuit 52 may execute a computer program 66 stored in the memory 64 that configures the processor 62 of the wireless device 50, operating in a radio access network that can provide a plurality of QoS levels for user data flowing to and from the wireless device 50, to select the QoS level. In these embodiments, the processing circuit 52 is configured to establish a packet data session via the radio access network. The processing circuit 52 is also configured to receive, from the radio access network via the transceiver circuitry, cost information associated with each of one or more QoS levels, and select, for user data for at least a first application or service, a QoS level from among the plurality of QoS levels based on the cost information. The processing circuit 52 is also configured to transmit packets carrying user data for the first application or service to the radio access network via the transceiver circuit 56. The transmission may include applying a QoS treatment to the user data according to the selected QoS level.

According to some embodiments, the processing circuit 52 of the wireless device 50 is also configured to perform a corresponding method 500 that includes establishing a packet data session via the radio access network (block 502) and receiving, from the radio access network, cost information associated with each of one or more QoS levels (block 504). The method 500 also includes selecting, for user data for at least a first application or service, a QoS level from among the plurality of QoS levels based on the cost information (block 506). The method 500 further includes transmitting packets carrying user data for the first application or service to the radio access network (block 508), where the transmitting includes applying a QoS treatment to the user data according to the selected QoS level.

In some cases, the selecting is based on predetermined authorization or preference information associated with the first application or service. Applying the QoS treatment to the user data according to the selected QoS level may include mapping the packets to one or more radio bearers, or to other access network resources used for QoS differentiation, based on the selected QoS level, and/or marking packets carrying user data for the first application or service with a first QFI, corresponding to the selected QoS level, where transmitting the packets carrying user data for the first application or service includes transmitting the packets to the radio access network.

In some of these latter embodiments, the method may further comprise marking packets carrying user data for a second application or service with a second QFI, the second QFI differing from the first QFI and identifying a QoS level differing from the QoS level identified by the first QFI. These examples further comprise transmitting the packets carrying user data for the second application or service to the radio access network. In some of these embodiments, the second QFI identifies a default QoS level; this default QoS level may, for example, have a lowest associated cost among the plurality of QoS levels, according to the received cost information. In some embodiments, the method further comprises receiving one or more restrictions associated with the QoS level identified by the first QFI, the one or more restrictions specifying limits on timing, duration, and/or quantity with respect to packet transmissions for the first application or service at the QoS level identified by the first QFI, and wherein said transmitting the packets carrying user data for the first application or service is performed according to the received restrictions The method 500 may also include presenting to a user of the wireless device, using a MMI, two or more choices for service levels for a first application or service, the two or more selections corresponding to respective QoS levels having differing costs according to the cost information and receiving a user selection of one of the two or more choices for service levels for the first application or service, where the selecting of the QoS level from among the plurality of QoS levels is based on the user selection. This selection of one of the two or more choices may be specific to the first application or service, in some embodiments, or may refer to multiple or all applications or services, in others.

Figure 6A:
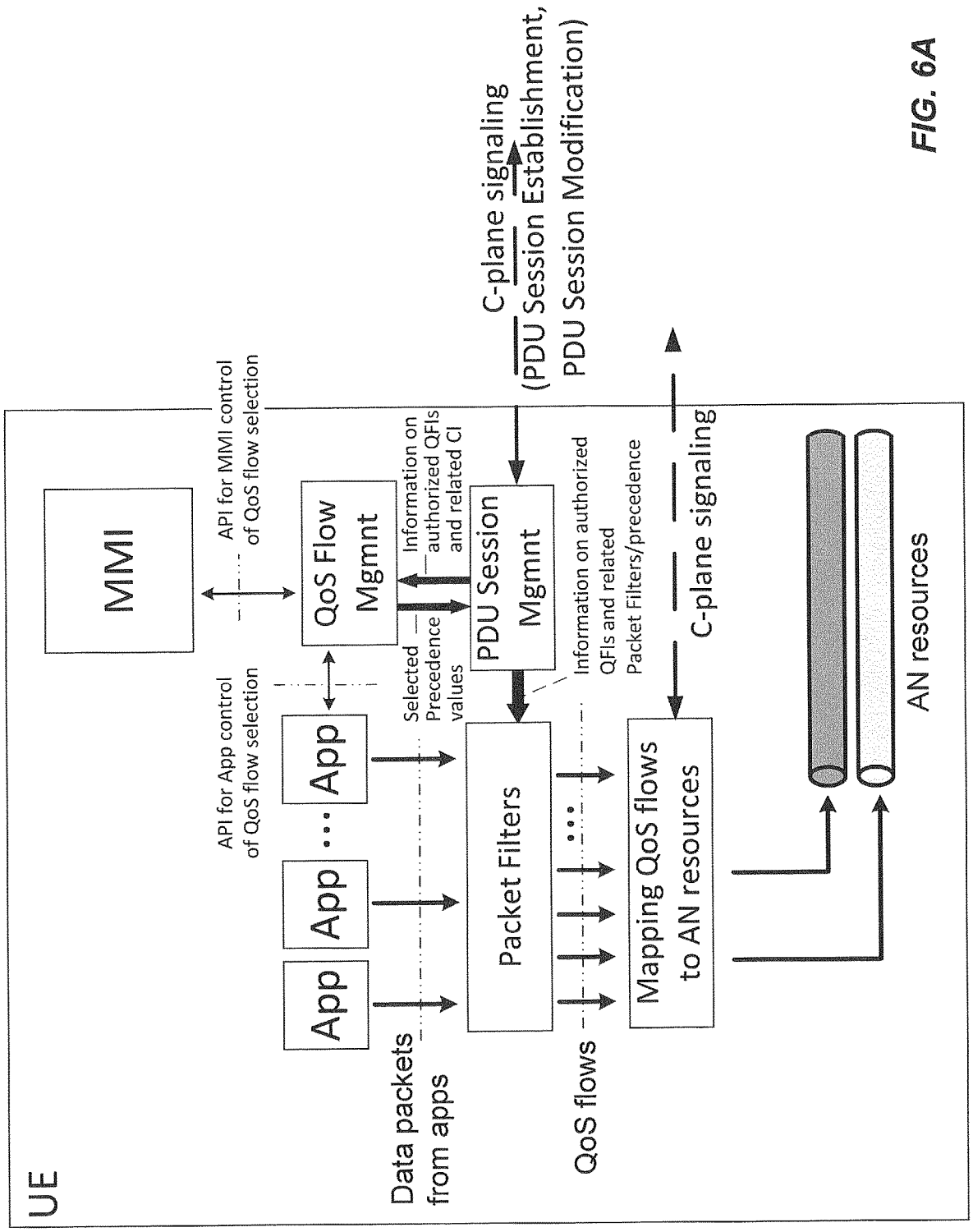
FIG. 6A illustrates a possible distribution of functional elements in the wireless device supporting some embodiments of the invention.

FIG. 6A depicts one possible distribution of functional elements in a UE supporting embodiments of invention. As described above and according to current specifications, the UE may receive multiple authorized QoS rules in the PDU Session Establishment Accept message, sent from the SMF and forwarded via the AMF and (R)AN. The authorized QoS rules can be of types: 1) default QoS rule, 2) negotiated QoS rule or 3) pre-authorized QoS rule. Negotiated QoS rules are sent to the UE as a result of, for example, negotiations between applications in the UE and application functions (AFs) in the network. Pre-authorized QoS rules are set by the service provider/operator based on subscription or other policies. The default QoS rule is set by the service provider/operator and used for traffic that has not been covered by any other QoS rule. Each QoS rule includes a QFI used for the marking of packets. Packets belonging to the same QoS flow are marked with the same QFI. The QoS rules may also contain packet filters and corresponding precedence values used for uplink filtering. In addition, QoS rules can be added/updated through the PDU Session Modification procedure (3GPP TS 23.502, v. 0.2.0, section 4.3.3). For example, if the subscription is updated during an established PDU session, or if the UE or Network initiates changes to any packet filter precedence value(s), in order to modify to which QoS flow an application data flow is mapped during the packet filter evaluation process.

Figure 13:
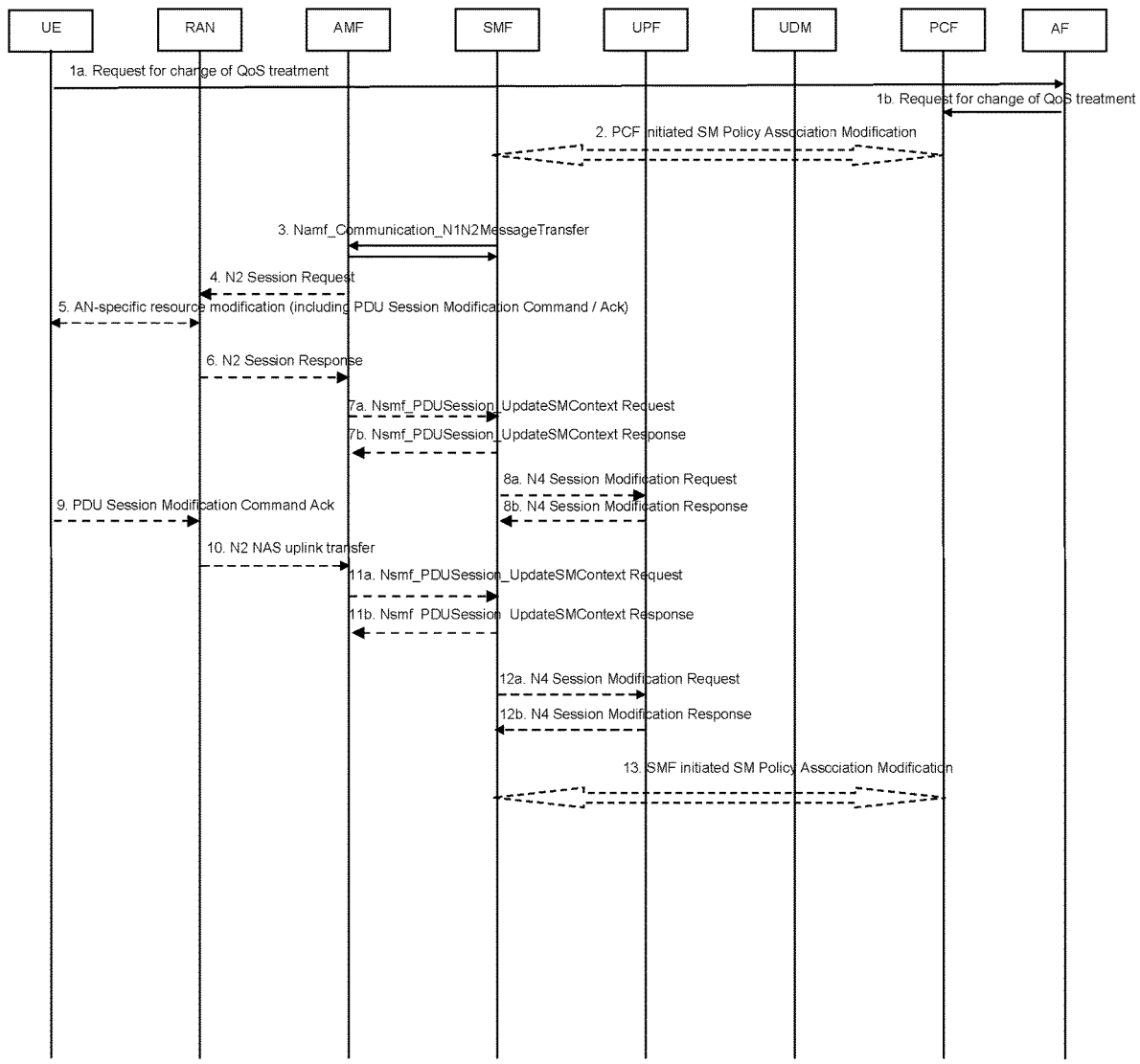
FIG. 13 is a diagram illustrating PDU Session Modification procedure with the PCF initiated SM Policy Association Modification being triggered due to an application layer request from the UE, according to some embodiments.

FIG. 13 depicts one example of how a UE, in step 1a, can request for a change of QoS treatment using application layer signaling, e.g. using HTTP or SIP/SDP, towards an AF. Consequently, the Network may initiate such changes, using the network requested PDU Session Modification procedure, as a trigger from an AF for which the UE has requested a change of how to map application data of the AF as described in steps 1a and 1b in FIG. 13.

Figure 6B:
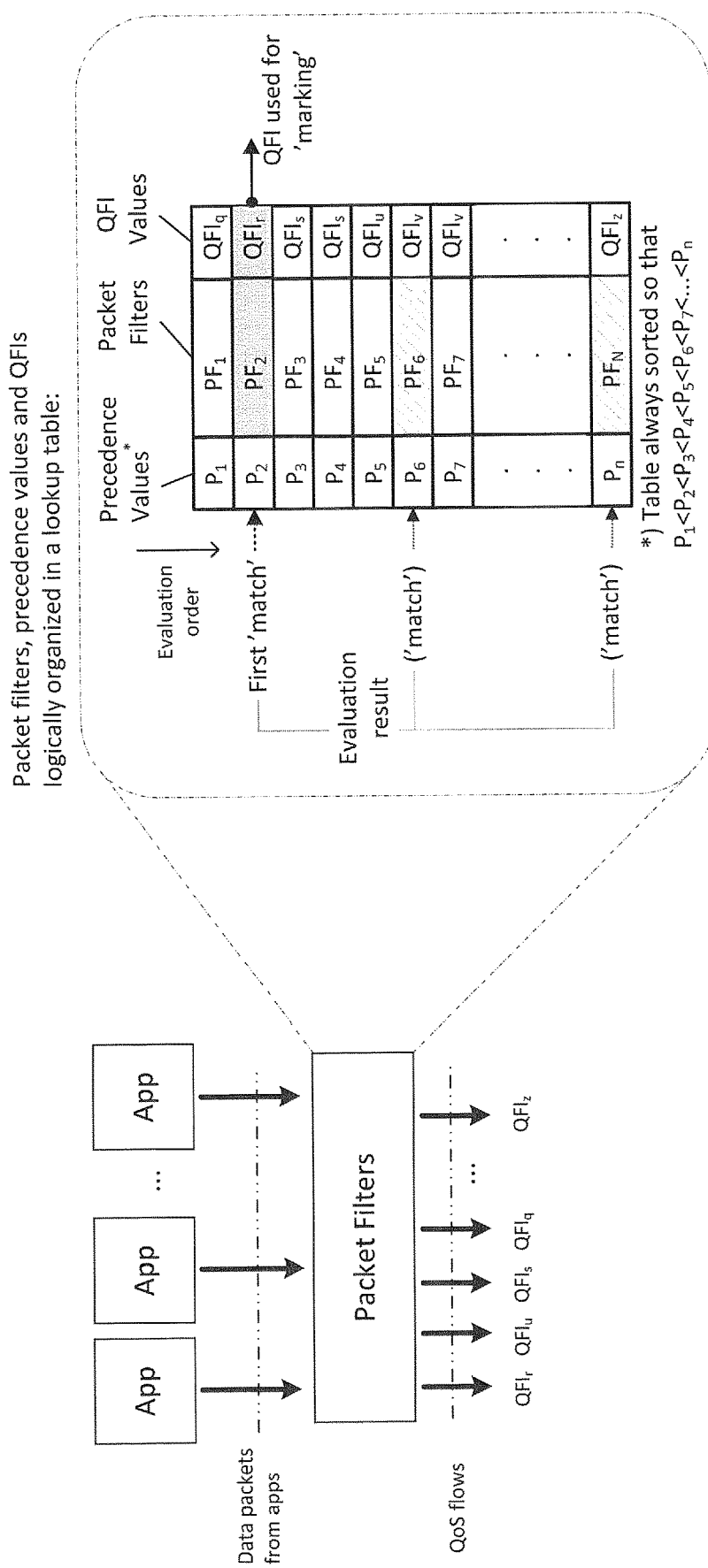
FIG. 6B illustrates an embodiment of mapping of data packets to QoS flows with packet filters, precedence values and QFIs depicted as logically organized in a lookup table.

The embodiments target how the pre-authorized QoS rules (type 3) and the associated QoS flows may be used by a UE implementation. In FIG. 6A, different applications (App) send data packets to the lower protocol layers for uplink transmission. As indicated in FIG. 6A, each application data flow is first sent to the Packet Filters function, where packet filters are evaluated to determine which QFI value an application data packet is to be marked with. This is further detailed in FIG. 6B, where packet filters, precedence values and QFIs are depicted as logically organized in a lookup table. During the packet filter evaluation, application data packets (e.g. their header fields) are analyzed to determine whether they fulfil the characteristics determined by the packet filters (e.g., if they contain an IP destination address that is in the range specified by the packet filter). Whenever an application data packet fulfils the characteristics determined by a packet filter (i.e. 'matches' the filter), the data packet is marked with the QFI associated with that packet filter, and the packet filter evaluation for the particular application data packet is stopped. Among all the available packet filters there might be more than one 'matching' packet filter for a certain application data packet, possibly associated with different QFIs. However, only the first 'match' will be considered and the QFI associated with this packet filter is used for marking of that application data packet. Which of the packet filters that is evaluated first, is determined by the packet filter precedence values. As a result, modification of the precedence values may change the order between 'matching' filters, putting another of the 'matching' packet filters first in search order and becoming the 'first match'. In this case the application data packet would be marked with the other 'matching' packet filter's associated QFI.

In some embodiments, the handling of the packets according to various QoS levels need not involve marking of packets with QFIs based solely on analysis of Packet Filters; in these embodiments, for example, the packets may be mapped to particular QoS flows through direct QFI marking, based on their respective application's configured QoS levels.

Figure 6C:
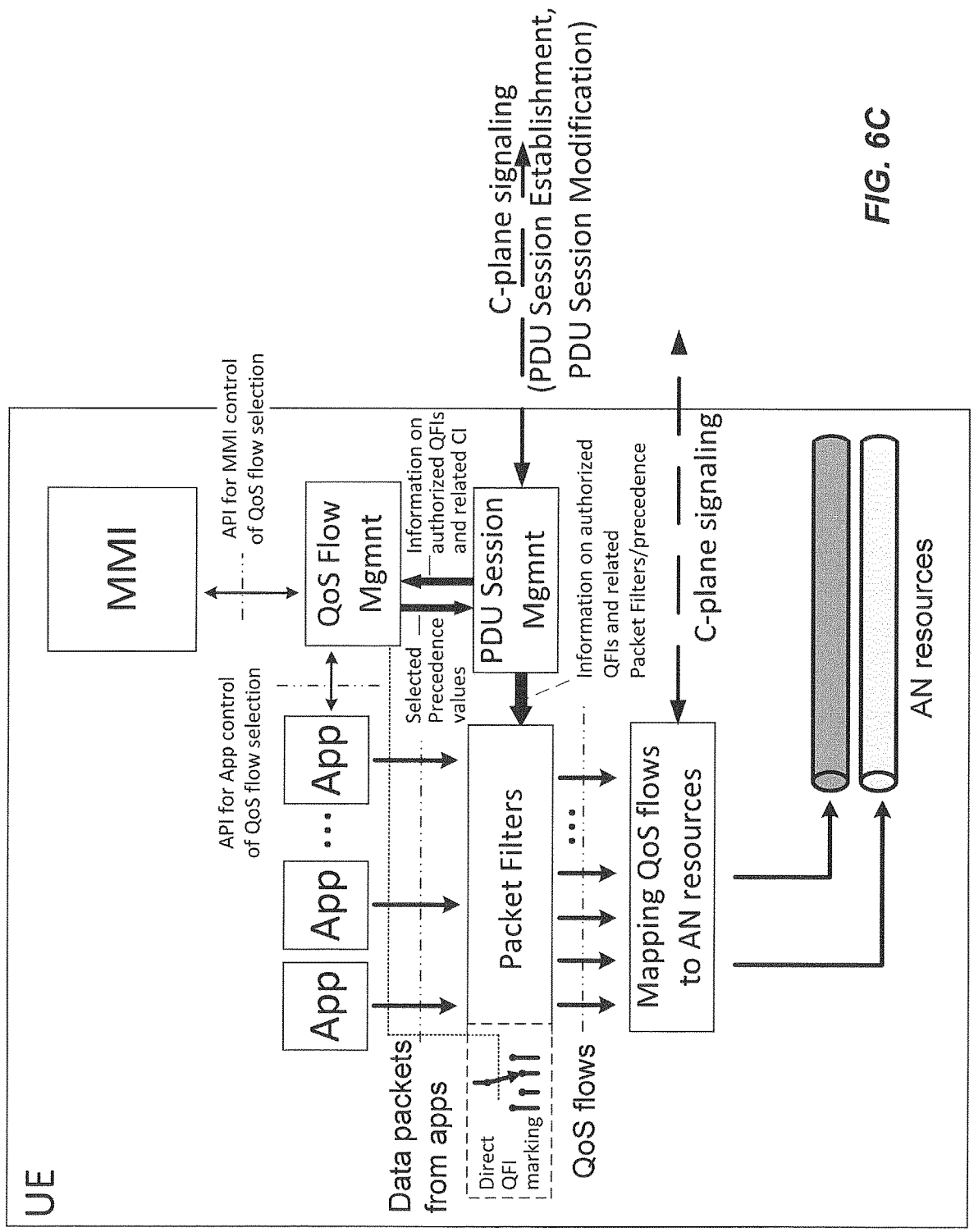
FIG. 6C illustrates a possible distribution of functional elements in the wireless device supporting some other embodiments of the invention.

FIG. 6C depicts one possible distribution of functional elements in a UE supporting embodiments of the invention. The functionality is identical to what is depicted in FIG. 6A, except for the addition of a 'Direct QFI marking' function. This enables packets belonging to an application packet flow to be marked with QFI values without packet filter analysis. The QFI used for the marking in this case is governed by the depicted QoS Flow Mgmnt function. The direct QFI marking function may be instantiated for each application to provide direct QFI marking for each application packet flow.

In some embodiments, however, the data packets are marked by the Packet Filters function with QFIs corresponding to the matching packet filter. This functionality is part of the current specifications, see 3GPP TS 23.501, v. 0.3.0, section 5.7. Also, part of current specifications is the subsequent step, where the QoS flows are mapped to the appropriate Access Network (AN) resources, based on signaling between the UE and the AN.

The QoS Flow Management function receives information on pre-authorized QoS rules and related CI from PDU Session Management. According to some embodiments, the CI is included in the QoS rules received in the PDU Session Establishment Accept message or the PDU Session Modification Accept message.

In other embodiments, it is the user that selects a service level, by which the wireless device then selects the QoS level. The QoS Flow Management function has APIs to the Man Machine Interface (MMI) and the different Applications (App). The MMI may use the API to retrieve information from the QoS Flow Management function regarding pre-authorized QoS rules and to manage the use of the pre-authorized QoS flows, by all or a sub-set of the Applications. The QoS Flow Management function manages the use of the QoS flows by determining the appropriate Packet Filter priorities and resulting precedence values. As a following step, the QoS Flow Management function sends any updated precedence values to the PDU Session Management function that initiates a PDU Session Modification to request a change of the precedence values from the network. In other embodiments, the QoS Flow Management function determines the QoS level (e.g. 5QI, Priority level) to be requested for the application and sends requested QoS and information identifying the application e.g. Application ID or Packet Filters (TFT) to the PDU Session Management function that initiates a PDU Session Modification to request a change of the QoS for the application from the network. In other embodiment, the user selects the Charging level to be applied for an application, and the UE sends requested Charging level and information identifying the application e.g. Application ID or Packet Filters (TFT) to the PDU Session Management function, in the UE, that initiates a PDU Session Modification to request a change of the charging level for the application from the network.

It will be appreciated that several of the functional blocks illustrated in FIG. 6A can be implemented using processing circuitry like the processing circuitry 52 shown in FIG. 4, as discussed above. As discussed above, the processing circuitry 52 is configured to establish a packet data session via the radio access network and receive cost information associated with each of one or more QoS levels. In embodiments where the user selects a service level, the processing circuit 52 is further configured to present to a user of the wireless device using a MMI, such as by an audio or touch-screen prompt, two or more choices for service levels for at least a first application or service that correspond to respective QoS levels having differing costs according to the cost information. The processing circuit 52 is configured to then receive, via the MMI, a user selection of one of the two or more choices for service levels and select, for user data for at least a first application or service, a QoS level from among the plurality of QoS levels based on the received user selection. The processing circuit 52 is configured to transmit packets carrying user data for the first application or service to the radio access network, where this transmitting comprises applying a QoS treatment to the user data according to the selected QoS level; in some embodiments, applying the QoS treatment to the user data may include determining the appropriate Packet Filter priorities and resulting precedence values, and negotiating changes to the Packet Filter precedence values with the network by means of the PDU Session Modification procedure. This is done to cause the Packet Filter function to mark packets carrying user data for the first application or service with a first QFI identifying a QoS level that corresponds to the user selection. The packets carrying user data for the first application or service are then transmitted to the radio access network.

Figure 5:
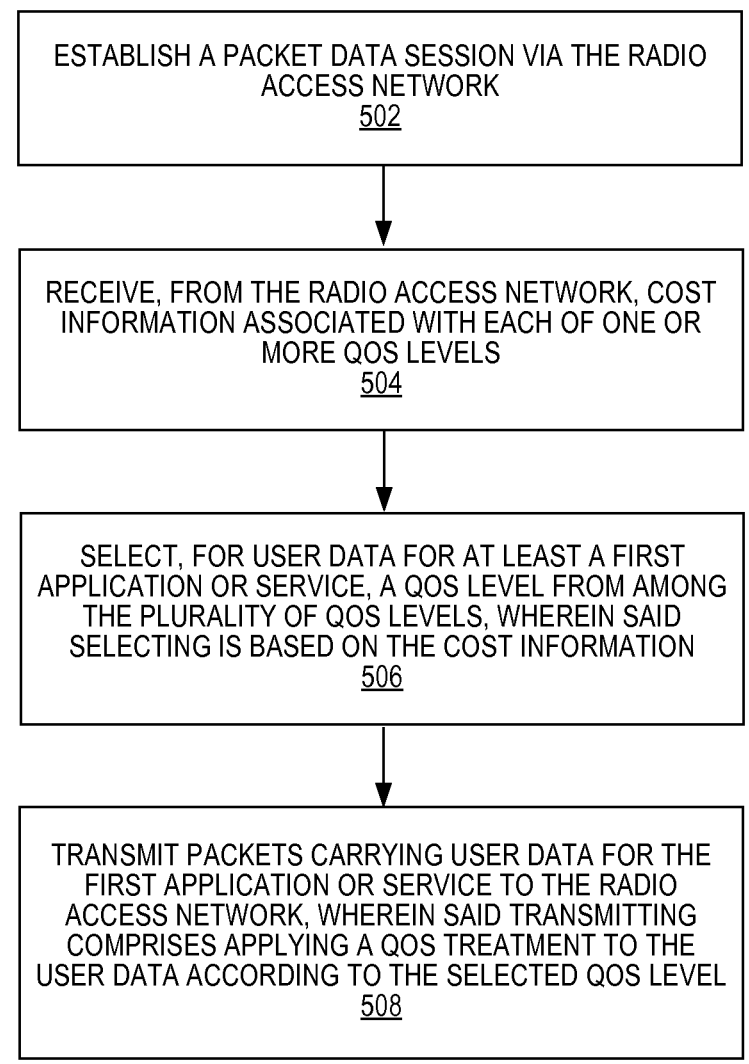
FIG. 5 illustrates a method in the wireless device where the wireless device selects and applies the QoS level, according to some embodiments.
Figure 7:
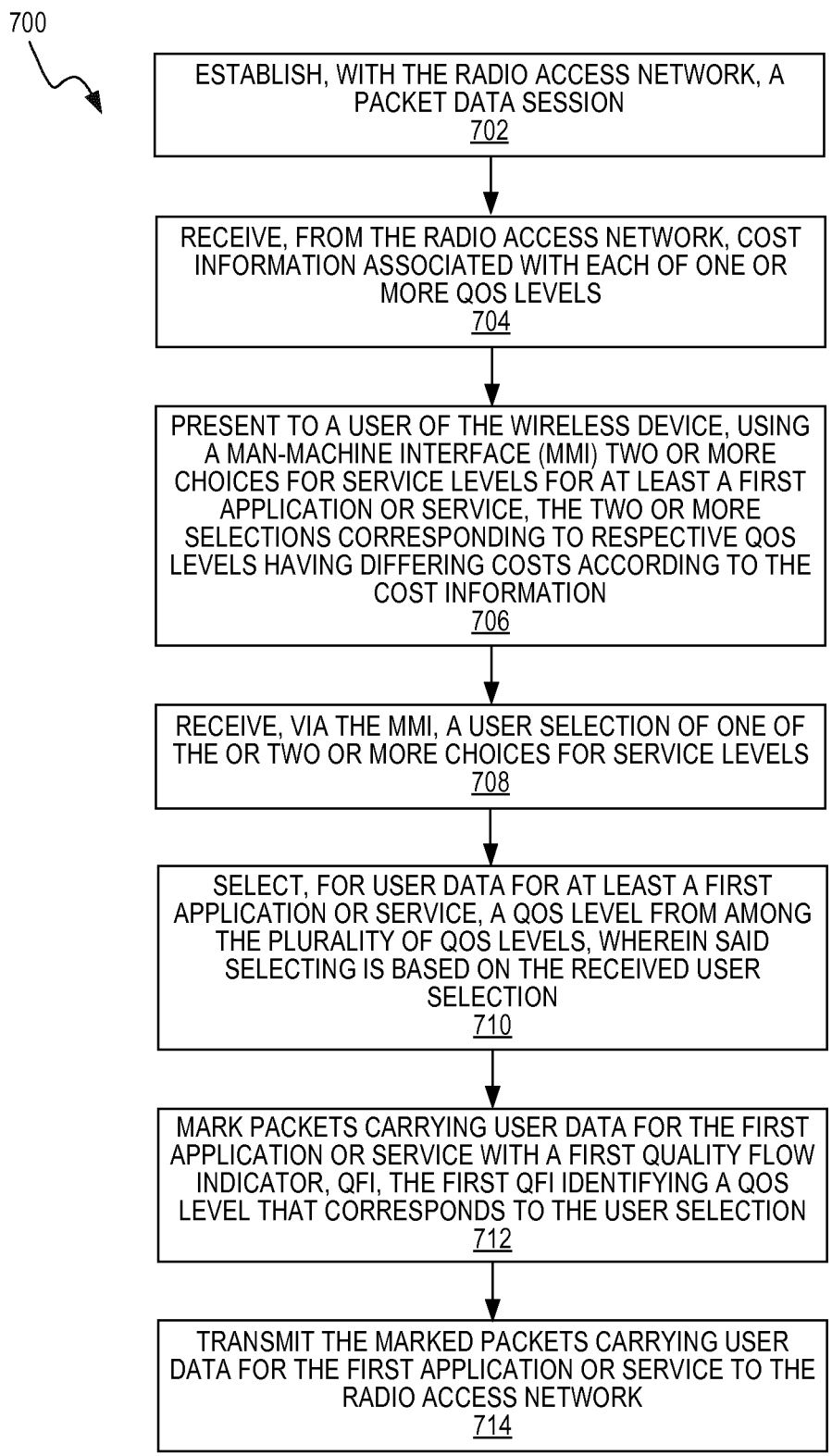
FIG. 7 illustrates a method in the wireless device where the wireless device applies the QoS level based on a user selection, according to some embodiments.

The wireless device 50 shown in FIG. 4 may thus, in some embodiments, be configured to perform a corresponding method 700, as illustrated in FIG. 7, in addition to or instead of the method 500 shown in FIG. 5. The method 700 includes establishing a packet data session via the radio access network (block 702) and receiving, from the radio access network, cost information associated with each of one or more QoS levels (block 704). The method 700 includes presenting to a user of the wireless device, using an MMI, two or more choices for service levels for at least a first application or service, the two or more selections corresponding to respective QoS levels having differing costs according to the cost information (block 706). The method 700 then includes receiving, via the MMI, a user selection of one of the two or more choices for service levels (block 708) and selecting, for user data for at least a first application or service, a QoS level from among the plurality of QoS levels, where the selecting is based on the received user selection (block 710). The method 700 further includes transmitting packets carrying user data for the first application or service to the radio access network (block 714), where this transmitting comprises applying a QoS treatment to the user data according to the selected QoS level; in some embodiments, applying the QoS treatment to the user data may include determining the appropriate Packet Filter priorities and resulting precedence values and negotiate changes to the Packet Filter precedence values with the network by means of the PDU Session Modification procedure. This is done to cause the Packet Filter function to mark packets carrying user data for the first application or service with a first QFI identifying a QoS level that corresponds to the user selection (block 712), such that the transmitting of the user data comprises transmitting the packets carrying user data for the first application or service to the radio access network.

Methods 500 and 700 are similar approaches to the same technical concept, in that the choice of a QFI is directly or indirectly based on cost information that maps to QoS flows. The cost information may be considered to be "zero," "low," or "high." Cost information can be provided in coarse grain or fine grain increments. For instance, 50 MB/month can be used for a QFI with certain QoS. In some cases, the user selection of one of the two or more choices is specific to the first application or service. Further, the order of the received information in methods 500 and 700 are examples i.e. the device can equally receive the user selection first and then the cost information from the network.

The method 700 may include determining the appropriate Packet Filter priorities and resulting precedence values and negotiate changes to the Packet Filter precedence values with the network by means of the PDU Session Modification procedure. This is done to cause the Packet Filter function to mark packets carrying user data for a second application or service with a second QFI, the second QFI differing from the first QFI and identifying a QoS level differing from the QoS level identified by the first QFI. This may involve using the selected QoS treatment. The packets may then be transmitted, carrying user data for the second application or service to the radio access network. In some cases, the second QFI identifies a default QoS level, and the default QoS level may have a lowest associated cost among the plurality of QoS levels, according to the received cost information.

The method 700 may include receiving one or more restrictions associated with the QoS level identified by the first QFI, the one or more restrictions specifying limits on timing, duration, and/or quantity with respect to packet transmissions for the first application or service at the QoS level identified by the first QFI. The transmission or selected QoS treatment of the packets carrying user data for the first application or service is then performed according to the received restrictions. The transmission or QoS treatment of the packets carrying user data for the first application or service to the radio access network may include mapping the packets to radio access network resources, based on the marking.

In one possible usage scenario, an MMI user selects a profile/level of QoS (e.g., cheapest/normal/cost no issue, "Gold"/"Silver"/"Bronze", or acceptable quality/higher/best quality). This setting could be applicable for all applications or a subset. The MMI user could also select different profiles/levels for different applications or groups of applications. Next, the CI provided with the QoS rules according to the embodiment is used by the MMI to inform the MMI user of any changed cost levels or time constraints related with the use of the pre-authorized QoS flows.

In another possible usage scenario, the applications retrieve information from the QoS Flow Management function, over the provided API, regarding pre-authorized QoS rules. Different QoS rules may be applicable for different Applications. The applications present the available QoS alternatives (e.g., normal/better/best) to the user via the MMI. In addition, applications may present CI provided with the pre-authorized QoS rules to enable the user to make an informed selection. As an alternative, applications may be pre-configured to select a certain pre-authorized QoS level if it is available.

The QoS Flow Management function ensures that only authorized applications are able to use the pre-authorized QoS flows. In one scenario, the authorization status is verified via the API towards the Applications that holds the authorization information. In another scenario, the CI contained in the pre-authorized QoS rules contains information on which applications or application types that are authorized to use a specific pre-authorized QoS flow. It is assumed that the MMI has access to information related to the applications via internal OS APIs.

In addition, applying the solution to EPS/GPRS would require extension of the EPS/GPRS signaling. For example, the CI can be added to the Activate default EPS bearer context request or MODIFY EPS BEARER CONTEXT REQUEST for EPS and PDP Context Accept messages for GPRS, such that the CI is associated to some EPS bearer or PDP context. In a similar manner as for 5G, the QoS Flow Management functionality controls which applications or application traffic is to use the EPS bearers or PDP contexts with enhanced QoS (and not restricted for specific UL packet filters).

In addition, the UE can be allowed to request resources (in a Request Bearer Resource Modification message for EPS, and an equivalent message for 5GS, and in a PDP context Activation request message for GPRS) which are not tied to a specific application. The UE would in this case therefore not supply any traffic flow description (which is today expressed through TFT/TAD). If accepted by the network (e.g., SMF/PCF for 5GS, and PGW/PCRF for EPS and PGW/GGSN/PCRF for GPRS), the network provides the UE with QFI, EPS bearer or PDP context with associated CI.

In FIG. 6A, packet filters make sure that packets that should get QoS of type 1), 2) and 3) are routed to the correct QoS flows. Various embodiments of the invention may apply to any type of provided QoS flow and enable the network operator to have different price plans for usage of default QoS levels and various pre-authorized QoS levels.

Figure 8:
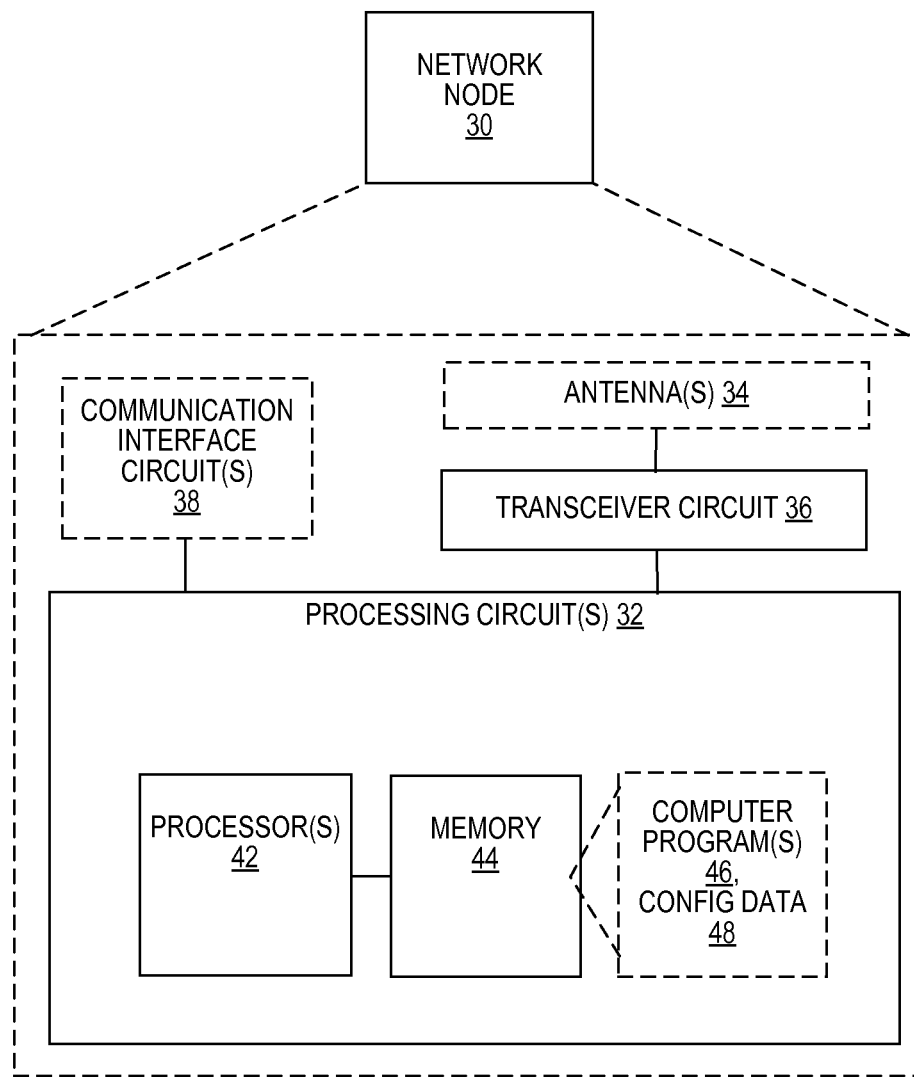
FIG. 8 is a block diagram of a network node configured to establish a packet data session with a wireless device that includes providing precedence values and cost information associated with QoS levels, according to some embodiments. A device without an antenna is equally applicable.
Figure 9:
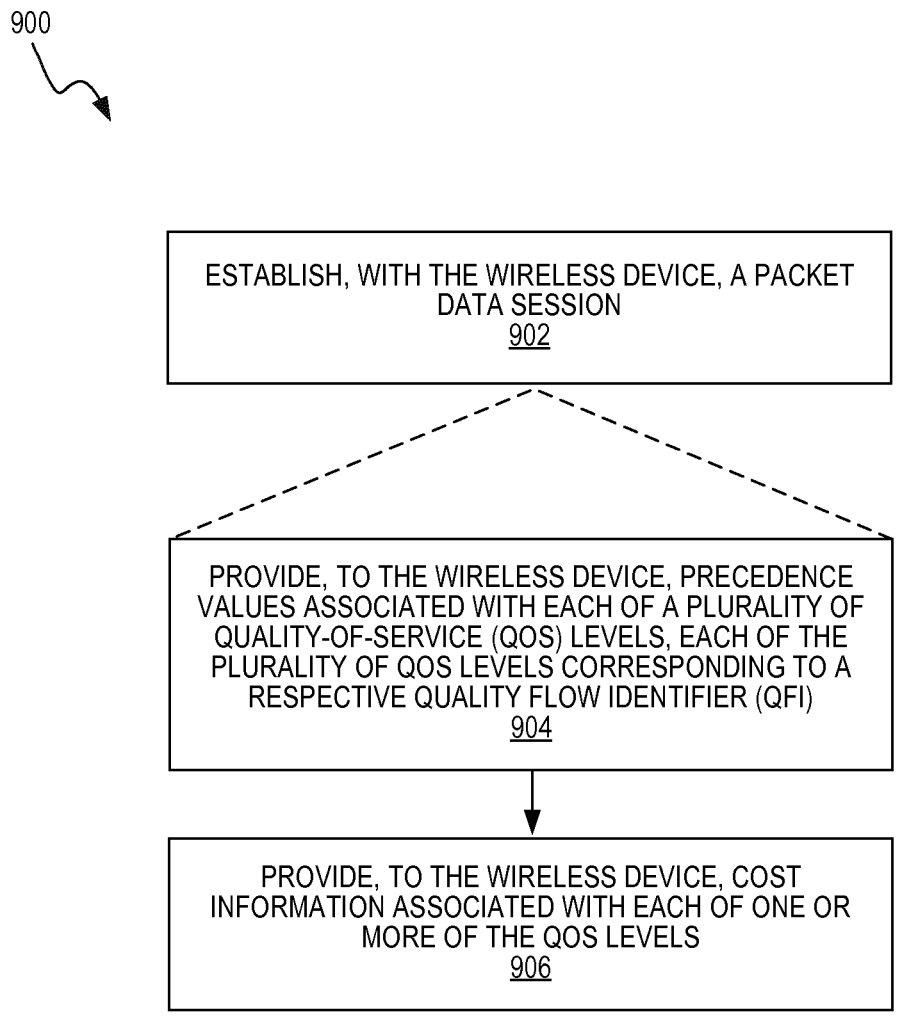
FIG. 9 illustrates a corresponding method in the network node, according to some embodiments.

With regard to the network side, FIG. 8 is a block diagram illustrating an access point of the wireless communication system, such as network node 30. In this example, the network node 30 may be a radio access node, Transmission and Reception Point (TRP), base station or other general radio node allowing communication within a radio network. Network node 30 may also represent, for example, a base transceiver station, a base station controller, a network controller, an enhanced or evolved Node B (eNB), a Node B, a gNB (access point supporting NR or 5G), Multi-cell/Multicast Coordination Entity (MCE), a relay node, an access point, a radio access point, or a Remote Radio Unit (RRU) Remote Radio Head (RRH). The network node 30 provides wireless access to other nodes such as wireless device 50 or other access nodes within a coverage area (e.g., cell) of the network node 30. The network node 30 described here in configured to operate in a 5G or NR network, but may be applicable to other networks or standards that utilize the techniques discussed herein.

As illustrated in FIG. 8, the network node 30 includes processing circuitry 32 comprising one or more processors 42 (e.g., CPUs, ASICs, FPGAs, and/or the like) and a memory 44 that stores computer programs 46 and, optionally, configuration data 48. The network node 30 may include communication interface circuitry 38 to communicate with the core network or other network nodes. The network node 30 also includes transceiver circuitry 36, which may include one or more transmitters and receivers coupled to one or more antennas 34, for communication with wireless devices, such as wireless device 50. In some embodiments, the functionality of the network node 30 described herein may be fully or partially implemented in software that is, for example, stored in the memory 44 and executed by the processor(s) 42.

In some embodiments, the memory 44 of the network node 30 stores instructions that when executed by one or more of the processors 42 configures the network node 30 to establish, with the wireless device 50, a packet data session by providing, to the wireless device 50 via the transceiver circuit 36, precedence values associated with each of a plurality of QoS levels, each of the plurality of QoS levels corresponding to a respective QFI. The establishment of the packet data session also includes providing, to the wireless device 50, cost information associated with each of one or more of the QoS levels.

The network node 30 is also configured to perform a method 900. The method includes establishing, with the wireless device 50, a packet data session (block 902). This involves providing, to the wireless device 50, precedence values associated with each of a plurality of QoS levels, each of the plurality of QoS levels corresponding to a respective QFI (block 904) and providing, to the wireless device 50, cost information associated with each of one or more of the QoS levels (block 906).

The method 900 may include providing, to the wireless device 50, one or more restrictions associated with a QoS level identified by a first QFI, the one or more restrictions specifying limits on timing, duration, and/or quantity with respect to packet transmissions for a QoS flow corresponding to the first QFI.

Figure 10:
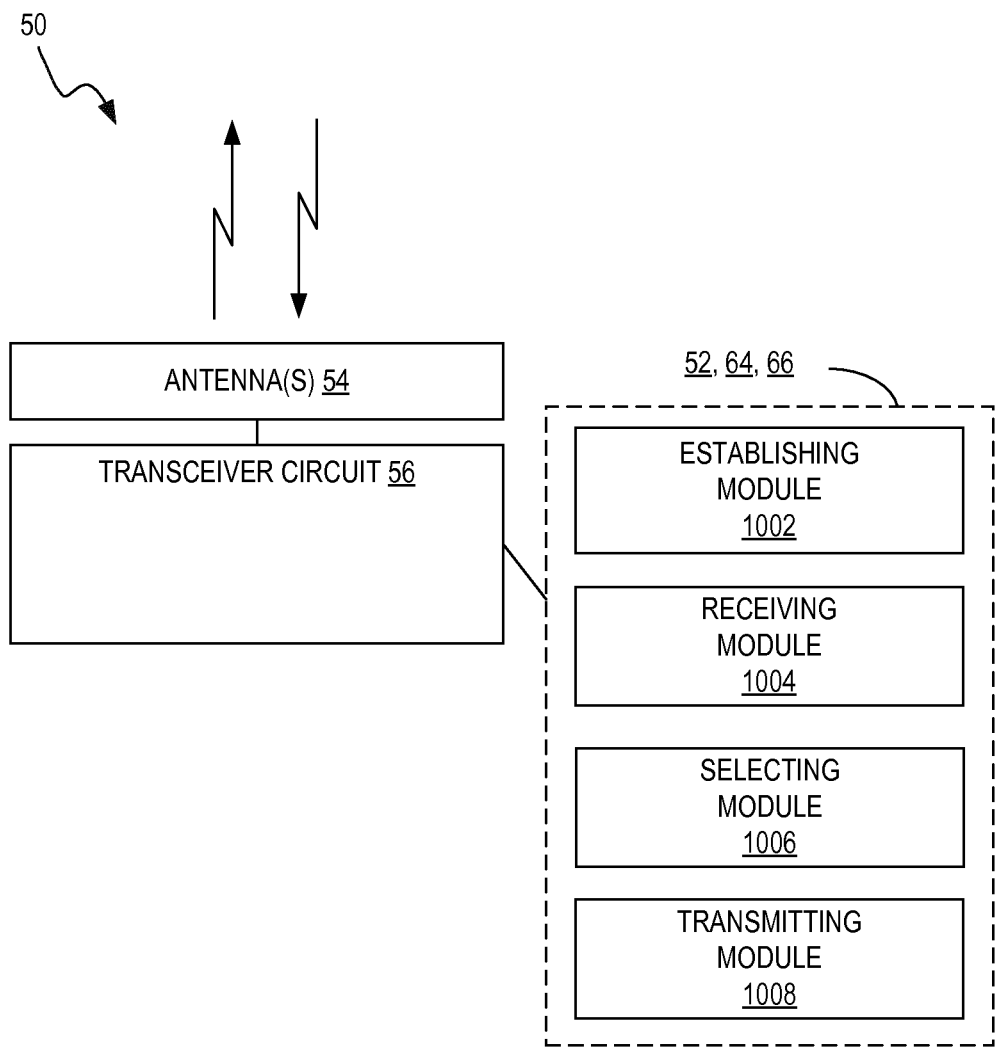
FIG. 10 is a block diagram illustrating a functional implementation of a wireless device, according to some embodiments. A device without an antenna is equally applicable.

Again, advantages of the embodiments disclosed herein include the reduction of unexpected increased costs and/or worse-than-expected performance, due to the pre-authorized QoS levels. This would likely reduce customer complaints and, in fact, allow the operator/service provider to promote the pre-authorized QoS levels to the end user. FIG. 10 illustrates an example functional module or circuit architecture as may be implemented in the wireless device 50 that is configured to operate in a radio access network that can provide a plurality of QoS levels for user data flowing to and from the wireless device 50. The illustrated embodiment at least functionally includes an establishing module 1002 for establishing a packet data session via the radio access network and a receiving module 1004 for receiving, from the radio access network, cost information associated with each of one or more QoS levels. The implementation also includes a selecting module 1006 for selecting, for user data for at least a first application or service, a QoS level from among the plurality of QoS levels, wherein the selecting is based on the cost information. The implementation further includes a transmitting module 1008 for transmitting packets carrying user data for the first application or service to the radio access network, where the transmitting includes applying a QoS treatment to the user data according to the selected QoS level.

Figure 11:
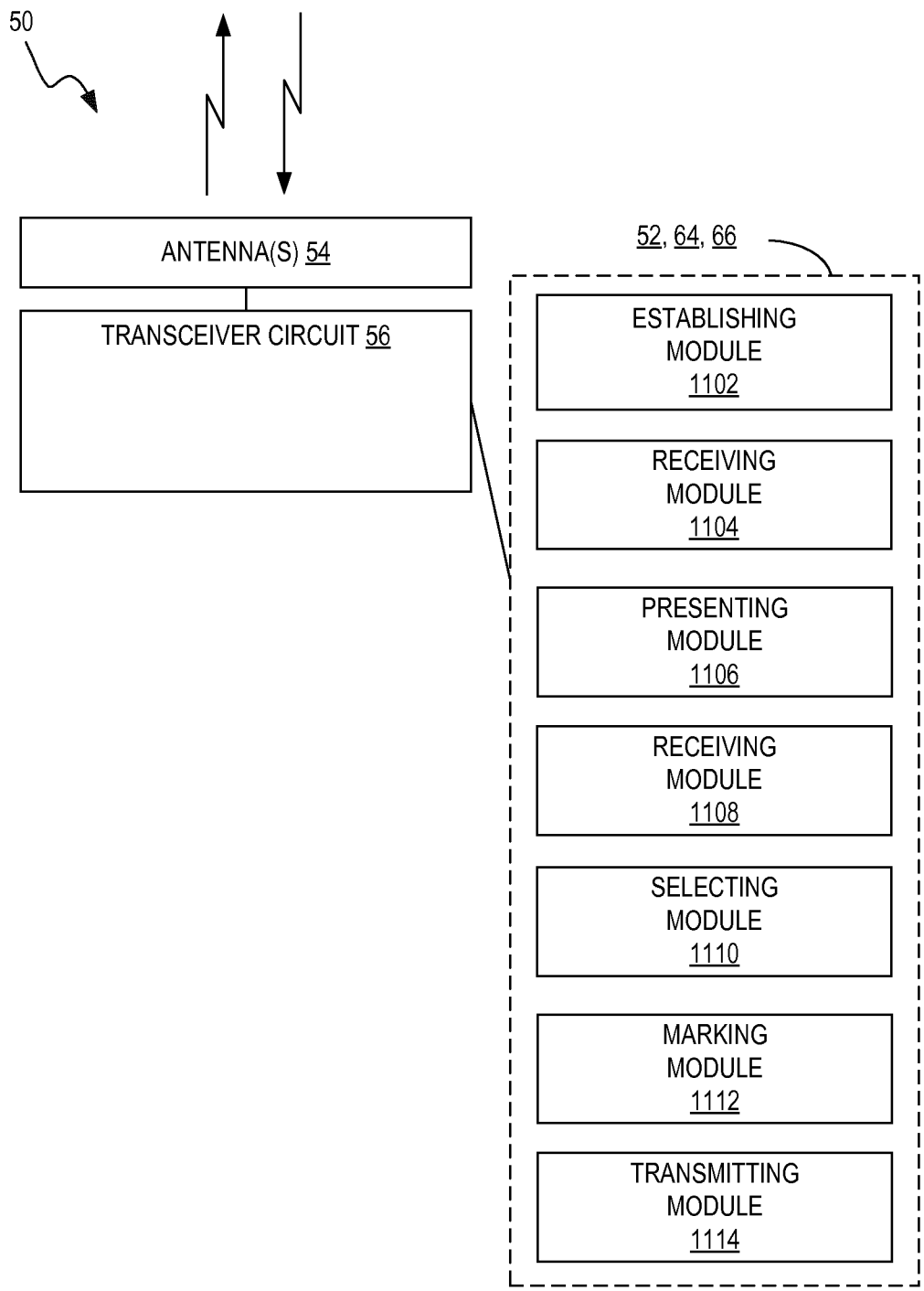
FIG. 11 is a block diagram illustrating another functional implementation of the wireless device, according to some embodiments. A device without an antenna is equally applicable.

Another functional implementation of the wireless device 50 is shown in FIG. 11 and includes an establishing module 1102 for establishing a packet data session via the radio access network and a receiving module 1104 for receiving, from the radio access network, cost information associated with each of one or more QoS levels. The implementation also includes a presenting module 1106 for presenting to a user of the wireless device 50, using an MMI, two or more choices for service levels for at least a first application or service, the two or more selections corresponding to respective QoS levels having differing costs according to the cost information. The implementation further includes a receiving module 1108 for receiving, via the MMI, a user selection of one of the two or more choices for service levels and a selecting module 1110 for selecting, for user data for at least a first application or service, a QoS level from among the plurality of QoS levels, where the selecting is based on the received user selection. The implementation also includes a marking module 1112 for marking, according to the packet filter evaluation, packets carrying user data for the first application or service with a first QFI, the first QFI identifying a QoS level that corresponds to the user selection, and a transmitting module 1114 for transmitting the packets carrying user data for the first application or service to the radio access network.

Figure 12:
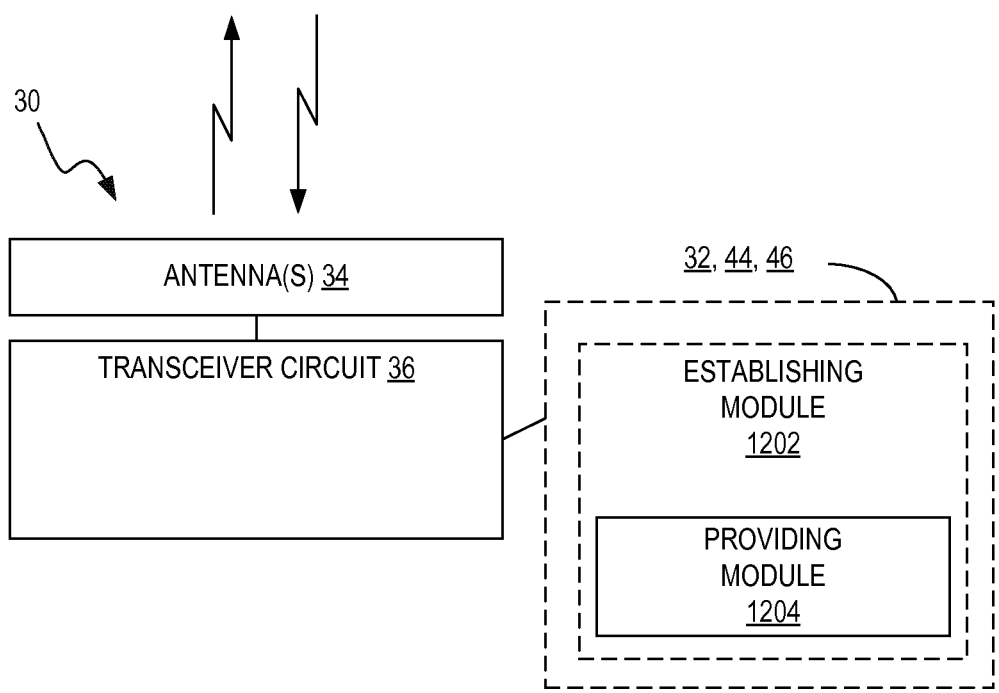
FIG. 12 is a block diagram illustrating a functional implementation of a network node, according to some embodiments.

FIG. 12 illustrates an example functional module or circuit architecture as may be implemented in a network node 30 in a radio access network configured to provide a plurality of QoS levels for user data flowing to and from a wireless device 50. The implementation includes an establishing module 1202 for establishing, with the wireless device 50, a packet data session. This establishing module 1202 includes a providing module 1204 for providing, to the wireless device, precedence values associated with each of a plurality of QoS levels, each of the plurality of QoS levels corresponding to a respective QFI. The providing module 1204 is also for providing, to the wireless device 50, cost information associated with each of one or more of the QoS levels.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, in a device operating in an access network that can provide a plurality of quality-of-service (QoS) levels for user data flowing to and from the device, the method comprising:
    establishing a packet data session via the access network;
    receiving, from the network, cost information associated with each of two or more QoS levels;
    selecting, for user data for at least a first application or service, a QoS level from among the two or more QoS levels, wherein said selecting is based on the cost information; and
    transmitting packets carrying user data for the first application or service to the access network, wherein said transmitting comprises applying a QoS treatment to the user data according to the selected QoS level;
    wherein applying the QoS treatment to the user data according to the selected QoS level comprises determining appropriate Packet Filter priorities and resulting Packet Filter precedence values and requesting changes with the network to cause a Packet Filter function to mark packets carrying user data for the first application or service with a first QoS flow indicator (QFI) corresponding to the selected QoS level;

wherein transmitting the packets carrying user data for the first application or service comprises transmitting the packets to the access network; and wherein determining the appropriate Packet Filter priorities and the resulting Packet Filter precedence values and requesting the changes with the network to cause the Packet Filter function to mark the packets carrying the user data for the first application or service with the first QoS flow indicator (QFI) corresponding to the selected QoS level is by means of a Packet Data Unit (PDU) Session Modification procedure.

2. The method of claim 1, wherein the method further comprises receiving one or more restrictions associated with the QoS level identified by the first QFI, the one or more restrictions specifying limits on timing, duration, and/or quantity with respect to packet transmissions for the first application or service at the QoS level identified by the first QFI, and wherein said transmitting the packets carrying user data for the first application or service is performed according to the received restrictions.

3. The method of claim 1, wherein selecting the QoS level for the first application or service based on the cost information comprises:

using a man-machine interface (MMI) to present to a user of the device, two or more selections corresponding to respective QoS levels having differing costs according to the cost information;

receiving a user selection of one of the two or more choices for service levels for the first application or service; and selecting the QoS level based on the user selection.

4. A method, in a device operating in an access network that can provide a plurality of quality-of-service (QoS) levels for user data flowing to and from the device, the method comprising:

establishing a packet data session via the access network;

receiving, from the network, cost information associated with each of one or more QoS levels;

selecting, for user data for at least a first application or service, a QoS level from among the plurality of QoS levels, wherein said selecting is based on the cost information;

transmitting packets carrying user data for the first application or service to the access network, wherein said transmitting comprises applying a QoS treatment to the user data according to the selected QoS level;

wherein applying the QoS treatment to the user data according to the selected QoS level comprises determining appropriate Packet Filter priorities and resulting Packet Filter precedence values and requesting changes with the network to cause a Packet Filter function to mark packets carrying user data for the first application or service with a first QoS flow indicator (QFI) corresponding to the selected QoS level, and wherein said transmitting of the packets carrying user data for the first application or service comprises transmitting the packets to the access network; and the method further comprising:

determining the appropriate Packet Filter priorities and the resulting Packet Filter precedence values and negotiating changes to the Packet Filter precedence values with the network by means of the PDU Session Modification procedure to cause the Packet Filter function to mark packets carrying user data for a second application or service with a second QFI, the second QFI differing from the first QFI and identifying a QoS level differing from the QoS level identified by the first QFI; and transmitting the packets carrying user data for the second application or service to the access network.

5. The method of claim 4, wherein the second QFI identifies a default QoS level.

6. The method of claim 5, wherein the default QoS level has a lowest associated cost among the plurality of QoS levels, according to the received cost information.

7. The method of claim 4, wherein said user selection of one of the two or more choices is specific to the first application or service.

8. The method of claim 4, wherein said transmitting the packets carrying user data for the first application or service to the access network comprises mapping the packets to access network resources, based on the marking.

9. A device configured to operate in an access network that can provide a plurality of quality-of-service (QoS) levels for user data flowing to and from the device, the device comprising:

transceiver circuitry configured for communicating with the access network; and processing circuitry operatively associated with the transceiver circuitry and configured to:

establish a packet data session via the access network;

receive, from the network via the transceiver circuitry, cost information associated with each of two or more QoS levels;

select, for user data for at least a first application or service, a QoS level from among the two or more QoS levels, wherein said selecting is based on the cost information;

transmit packets carrying user data for the first application or service to the access network via the transceiver circuitry, wherein said transmitting comprises applying a QoS treatment to the user data according to the selected QoS level; and apply the QoS treatment to the user data according to the selected QoS level by determining an appropriate Packet Filter priorities and resulting Packet Filter precedence values and negotiate changes to the resulting Packet Filter precedence values with the network by means of a Packet Data Unit (PDU) Session Modification procedure to cause a Packet Filter function to mark packets carrying user data for the first application or service with a first quality flow indicator (QFI)corresponding to the selected QoS level; and wherein said transmitting the packets carrying user data for the first application or service comprises transmitting the packets to the access network.

10. The device of claim 9, wherein the processing circuitry is further configured to receive one or more restrictions associated with the QoS level identified by the first QFI, the one or more restrictions specifying limits on timing, duration, and/or quantity with respect to packet transmissions for the first application or service at the QoS level identified by the first QFI, and to transmit the packets carrying user data for the first application or service is performed according to the received restrictions.

11. The device of claim 9, wherein the processing circuitry is configured to select the QoS level based on the cost information by displaying service level choices to a user of the device via a man-machine interface (MMI), the service level choices based on the cost information and corresponding to respective QoS levels, and receiving a user selection via the MMI that indicates a selected service level.

12. A device configured to operate in an access network that can provide a plurality of quality-of-service (QoS) levels for user data flowing to and from the device, the device comprising:
- transceiver circuitry configured for communicating with the access network; and
- processing circuitry operatively associated with the transceiver circuitry and configured to:
  - establish a packet data session via the access network;
  - receive, from the network via the transceiver circuitry, cost information associated with each of two or more QoS levels, wherein the two or more QoS levels have differing costs;
  - present to a user of the device, using a man-machine interface (MMI), two or more choices for service levels for a first application or service, the two or more choices corresponding to respective ones among the two or more QoS levels;
  - receive a user selection indicating a selected one of the two or more choices;
  - select one of the two or more QoS levels, based on the user selection;
  - transmit packets carrying user data for the first application or service to the access network via the transceiver circuitry, wherein said transmitting comprises applying a QoS treatment to the user data according to the selected QoS level;
  - mark packets carrying user data for a second application or service with a second QFI, the second QFI differing from the first QFI and identifying a QoS level differing from the QoS level identified by the first QFI; and
  - transmit the packets carrying user data for the second application or service to the access network.

13. The device of claim 12, wherein the second QFI identifies a default QoS level.

14. The device of claim 13, wherein the default QoS level has a lowest associated cost among the plurality of QoS levels, according to the received cost information.

15. The device of claim 12, wherein said user selection of one of the two or more choices is specific to the first application or service.

16. The device of claim 12, wherein the processing circuitry is configured to transmit the packets carrying user data for the first application or service to the access network by mapping the packets to access network resources, based on the marking.

* * * * *